United States Patent [19]

Zave

[11] Patent Number: 4,685,125
[45] Date of Patent: Aug. 4, 1987

[54] COMPUTER SYSTEM WITH TASKING

[75] Inventor: Derek A. Zave, Sea Bright, N.J.

[73] Assignees: American Telephone and Telegraph Company, New York, N.Y.; Bell Telephone Laboratories, Incorporated, Murray Hill, N.J.

[21] Appl. No.: 393,123

[22] Filed: Jun. 28, 1982

[51] Int. Cl.[4] ............................................. G06F 9/00
[52] U.S. Cl. .................................................... 379/96
[58] Field of Search ... 364/200 MS File, 900 MS File; 379/96

[56] References Cited

U.S. PATENT DOCUMENTS

| | | | |
|---|---|---|---|
| 4,220,990 | 9/1980 | Alles | 364/200 |
| 4,257,096 | 3/1981 | McCollough et al. | 364/200 |
| 4,257,097 | 3/1981 | Moran | 364/200 |
| 4,318,173 | 3/1982 | Freedman et al. | 364/200 |
| 4,356,546 | 10/1982 | Whiteside et al. | 364/200 |
| 4,419,728 | 12/1983 | Larson | 364/200 |
| 4,430,707 | 2/1984 | Kim | 364/200 |

OTHER PUBLICATIONS

Sperry Univac Reference Series 1100 Executive System Programs Reference 2-1 to 2-26, 1981.

*Primary Examiner*—Thomas M. Heckler
*Assistant Examiner*—John G. Mills
*Attorney, Agent, or Firm*—Ronald D. Slusky

[57] ABSTRACT

An integrated data processing and communication service is provided by a system which comprises a plurality of nodes interconnected via a packet-switched transport network. Each node includes a database processor and at least one node processor, with a number of terminals and hosts being connected to the latter via at least one front-end processor. Processes existing with each node processor are two types—application layer processes which perform "useful work" on behalf of the customers and the vendor of the service, and control layer processes, each of which manages, or provides some part of, the service itself. The processors are virtual memory processors and the program region of the virtual address space of each process includes both a process-specific image and shared image. The former is weakly linked to the latter and provides it, via a set of primitives, with a number of communications processing services including file/database management, application program control, interprocess communications, station access and message services. Such services are also available for use within the shared image itself. The shared image also provides a number of "supervisor" services including enforcement of a system of privileges for the primitives; memory allocation; condition handling; event services; and establishment and management of the tasking system.

9 Claims, 21 Drawing Figures

TASK SCHEDULING QUEUES

\* ACTIVE BIT
\*\* WAKEUP REQUEST BIT
\*\*\* RESOURCE SUSPENSION BIT

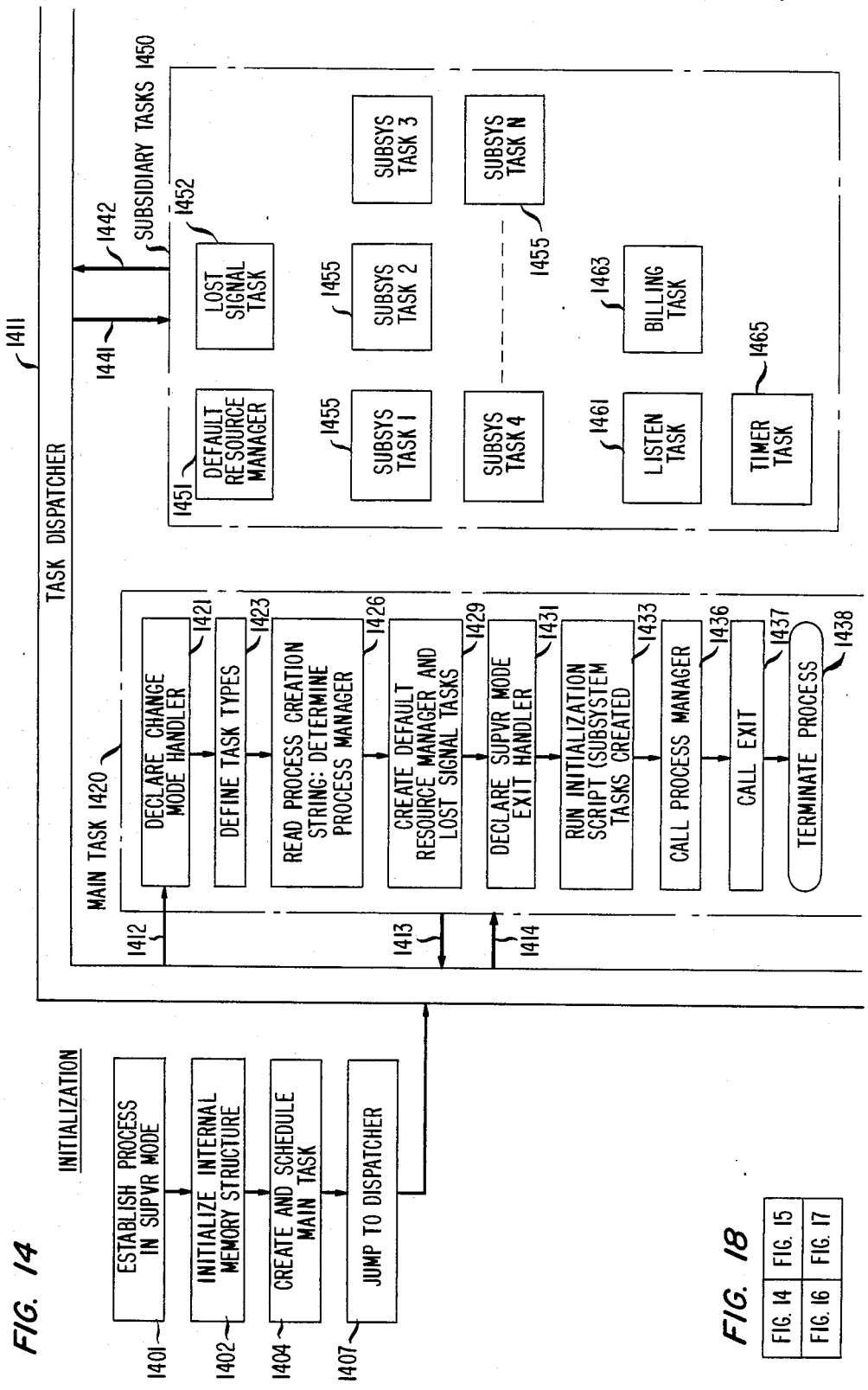

COMPUTER SYSTEM WITH TASKING

BACKGROUND OF THE INVENTION

The present invention relates to data communication and processing systems. In such systems, it is often useful to structure the program code executing within a process into so-called "tasks." A task is a software entity having an associated body of program code which is executed whenever program control within the process is vested in that task. As execution within the process proceeds, program control, i.e., control of the computer, passes among the various tasks and whenever program control passes from a task, its so-called "context"—which defines the execution state of the task at that moment—is saved. Thus each task within a process comprises an "independent thread of control" whose execution can be resumed at any time by restoring its context to the central processing unit (CPU) of the computer.

The order in which the tasks execute may be controlled, for example, by scheduling those of the tasks which are "runnable," i.e., ready to run, at any given time in accordance with priorities preassigned to the tasks. Whenever a task is "activated," i.e., made runnable, it is placed in a queue associated with its priority level, and whenever execution of the currently running task, i.e., the one having program control, is suspended, control is passed—illustratively by a so-called task dispatcher—to the first task in the nonempty queue having the highest priority.

Among the advantages of having a tasking capability is that it allows a software system to be designed with a great degree of modularity and permits the various functions performed within the system to be executed quite independently of one another. In particular, tasking greatly simplifies program design and coding because changes can be made in one part of a software system with little, if any effect, on any other part and because execution of the various functions to be performed is only required to be synchronized at specific points specified by the programmer. These are important considerations in the design of large software systems.

A further advantage of tasking is that a process does not necessarily have to suspend its execution when a particular activity within the process must be suspended to, for example, wait for an I/O or other operation to be completed. Rather, the process can suspend the particular task that needs to wait for that operation and then continue executing by picking up the thread, i.e., continuing execution, of any one or more tasks that are then runnable. This approach not only speeds up program execution within the process, but helps to minimize the frequency with which control of the CPU is switched from one process to the next, which is a time-consuming operation. Indeed, tasking is particularly advantageous in data communication-oriented systems because such systems engender a substantial number of I/O and other wait-inducing operations.

The present invention is particularly useful in systems in which system-supplied software, structured into tasks, provides various services to the user software—hereinafter referred to as the process-specific image—via, for example, user-callable routines, or "primitives." In such arrangements, it is desirable to have a way of integrating execution of the process-specific image with that of the system-supplied software. It is, for example, desirable to have a convenient mechanism for synchronizing the two. It is also desirable for the system-supplied software to be able to take control of a process away from the process-specific image when it needs to, e.g., to expeditiously provide services which the process-specific image has requested.

SUMMARY OF THE INVENTION

In accordance with the invention, processes in a system of the above-described type include not only tasks which provide various services to the process-specific image by, for example, manipulating data associated with the image, but also at least one task—referred to as the "image task" which manages execution of the process-specific image. In particular, the image task controls the vesting of program control in the process-specific image and it is via the image task that program control returns to the system-supplied software from the process-specific image. This approach advantageously provides the above-mentioned integration in that execution of the process-specific image and execution of the system-supplied data communication and/or processing software are each controlled by tasks executing in a common tasking environment.

In accordance with a feature of the invention, program control is temporarily taken from the process-specific image and vested in the image task whenever at least particular tasks within the system-supplied software are activated as the result of an action of the process-specific image. A typical such action is the calling of a primitive that activates a task. This approach is advantageous in that, for example, it is guaranteed that before control is returned to the process-specific image, the image task can issue a so-called task break which gives all then-active tasks which have a higher priority than the image task an immediate opportunity to run. (The image task has the lowest priority of any task in the embodiment described herein so that all tasks activated as a result of an action of the process-specific image will run before control returns to the image task and thus to the process-specific image.) This feature of the invention ensures, for example, that services requested by the process-specific image, e.g., via a primitive call, are provided expeditiously.

In accordance with a further feature of the invention, program control is taken from the process-specific image and vested in the image task whenever the process-specific image calls at least those primitives whose execution may make a task runnable. Such "task-activating" primitives thus execute in the image task rather than in the process-specific image. (Indeed, program control is vested in the image task in the embodiment described herein whenever the process-specific image calls any primitive.) This feature of the invention provides, for example, an advantageous way of synchronizing the execution of the process-specific image with the execution of primitive-activated tasks, as will be seen.

In addition to primitives, various AST (interrupt) service routines may also activate tasks and, in accordance with a further feature of the invention, program control is vested in the image task no later than the end of execution of any such routine, i.e., before program control is returned to the process-specific image. Thus any tasks made runnable by an AST service routine are, again, assured of an immediate opportunity to run via an image-task-issued task break.

The image task and the various aspects and features of the invention are described, for example, beginning in Sec. III.A.5 of the Detailed Description.

BRIEF DESCRIPTION OF THE DRAWING

In the drawing,

FIGS. 14-17, when arranged as shown in FIG. 18, depict the execution flow of an application process;

DETAILED DESCRIPTION

TABLE OF CONTENTS

I. SYSTEM HARDWARE
  A. Hardware Architecture
    1. System
    2. Node
    3. Processor
  B. Virtual Memory
    1. The Virtual Memory Space
    2. The Hardware Mechanism
II. SYSTEM SOFTWARE—ARCHITECTURE
  A. Processes
    1. The Process Concept
    2. Application and Control Layer Processes
  B. The Shared Image
    1. Processing Services & Subsystems; Primitives
    2. Primitive Calls; Subroutines
    3. Supervisor Services
    4. Overview of Shared Image Software Structure
  C. Tasking
    1. An Introduction
    2. Task Synchronization
    3. Task Control Blocks
  D. Processor Access Modes/Stack Areas
III. SYSTEM SOFTWARE—EXECUTION FLOW
  A. Application Processes
    1. Process Creation Scenario
    2. Initial Execution
    3. Main Task
    4. Process Manager
    5. Invention: The Image Task
    6. Execution of Process-Specific Image
    7. Process Termination
  B. Control Layer Processes
  C. Task Dispatcher
  D. Change Mode Handler
IV. DETAILS OF SUPERVISOR SOFTWARE STRUCTURE

I. SYSTEM HARDWARE

I.A.1 Hardware Architecture—System

Figure 1:
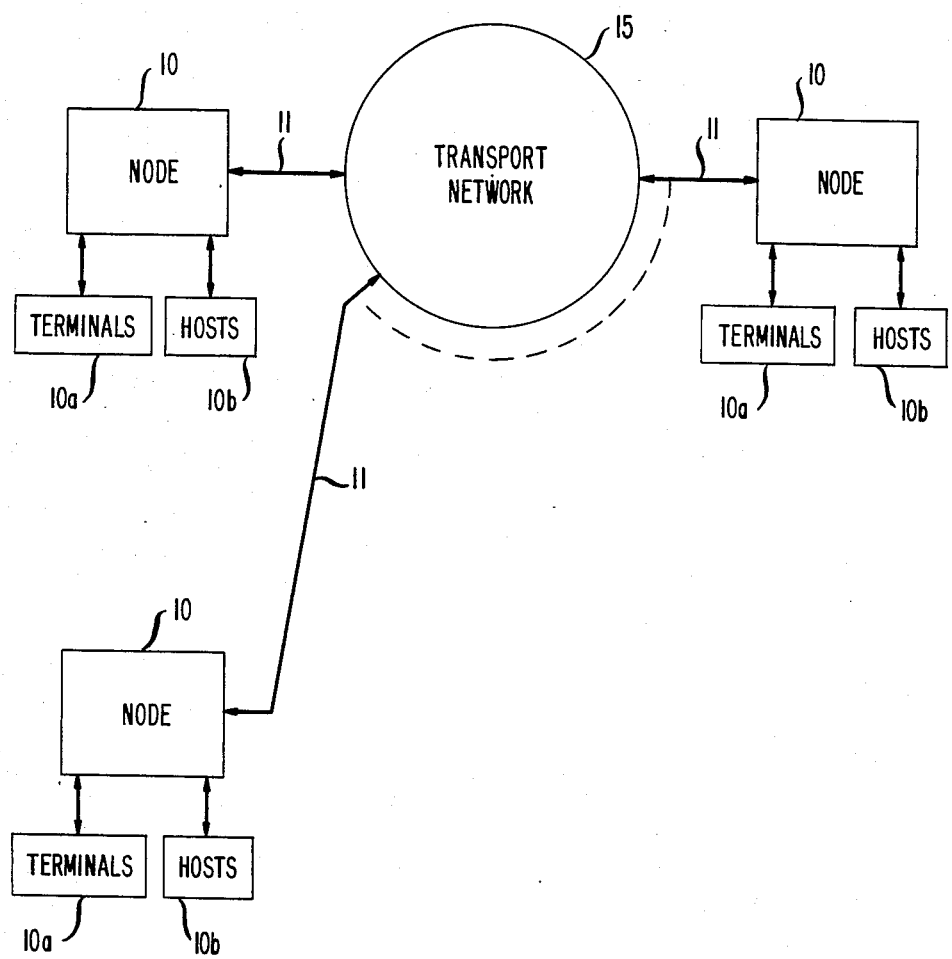
FIG. 1 is a block diagram of a system in which the present invention is used.

FIG. 1 depicts a system which provides an integrated data processing and communications service (hereinafter referred to as the "communications service" or, simply, the "service") to a plurality of customers. The system includes a number of nodes 10 which are located on the premises of the vendor of the service. At the heart of each node are one or more digital computers as described below (Sec. I.A.2). A plurality of data terminals 10a and host computers, or hosts, 10b are connected to nodes 10 via suitable data lines. Most of the terminals and hosts belong to the customers and are located on their premises. Some, however, belong to the vendor and are used, for example, for system management. Nodes 10 communicate with each other via a packet switched transport network 15. The nodes are connected to the network via respective links 11 which carry data at 56 kb/s using a protocol which conforms to CCITT standard X.25. Various ones of the nodes may be dedicated to specific functions, such as billing, service provisioning, maintenance, etc.

The communications service provides the customers with a number of capabilities. These include time-shared execution of customer- and vendor-provided application programs stored within the nodes; storage of customer data in databases maintained within the nodes; support of customer-program-callable software "building blocks" that provide such services as editing, command interpreting, forms facilities, and the like; a distributed processing capability wherein processes executing at various nodes can communicate on a time-critical basis with processes executing at other nodes; and a store-and-forward message service.

I.A.2 Hardware Architecture—Node

Figure 2:
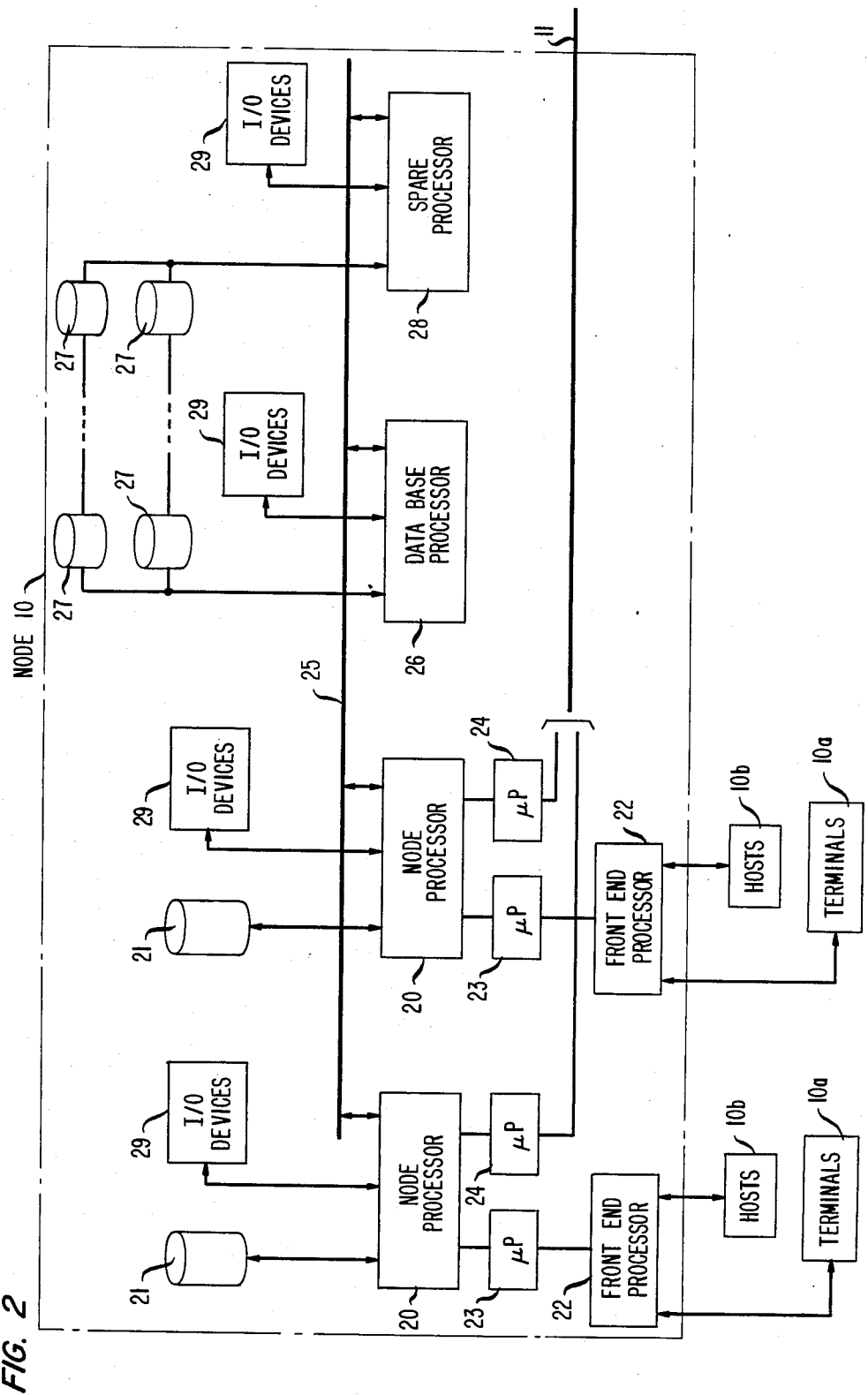
FIG. 2 is a block diagram of a node within the system of FIG. 1.

FIG. 2 is a block diagram of an individual one of nodes 10. The node illustratively includes two node processors 20 and a database processor 26. Each of these processors is illustratively a Digital Equipment Corporation (DEC) VAX 11/780 computer running under the DEC-supplied VMS operating system. (DEC, VAX and VMS are trademarks of Digital Equipment Corporation.) The node further includes a spare VAX 11/780 processor 28 which can take the place of either the database processor or one of the node processors. Other ones of nodes 10 (FIG. 1) may have fewer or more than two node processors, depending on the anticipated processing demand. Communication among the processors is carried out via bus 25, which illustratively is a DEC-supplied PCL (parallel communication link) bus.

Mass storage, e.g., disk, units 21 are associated with each node processor and mass storage units 27 are associated with database processor 26. Mass storage units 27 are dual ported with, and thus can be accessed by, spare processor 28. Associated with each of the four processors are general purpose input/output (I/O), e.g., CRT, terminal devices 29.

Also associated with each node processor is at least one front-end processor 22 which provides an interface between the node processor, on the one hand, and associated ones of terminals 10a and hosts 10b, on the other hand. Front-end processors 22 are, illustratively, IBM Series/1 computers running under the IBM-supplied RPS operating system. Each front-end processor communicates with its respective node processor using an X.25 protocol. DEC-supplied firmware controlling a DEC-supplied microprocessor 23 performs the DTE role in Level 2 (the "link" level) of the protocol. Another microprocessor 24 associated with each node processor serves a similar function with respect to X.25 communications over link 11.

The function of node processors 20 is to execute programs on behalf of the customers and the vendor. To this end, the mass storage units 21 associated with each processor are used primarily, if not exclusively, to support the processing currently going on in that processor. Virtually all data, programs and other files, both those belonging to the customer and those belonging to the vendor, are stored in a database contained within mass storage devices 27. The function of the latter is to manage the database and to provide the node processors with access to it.

I.A.3 Hardware Architecture—Processor

Figure 3:
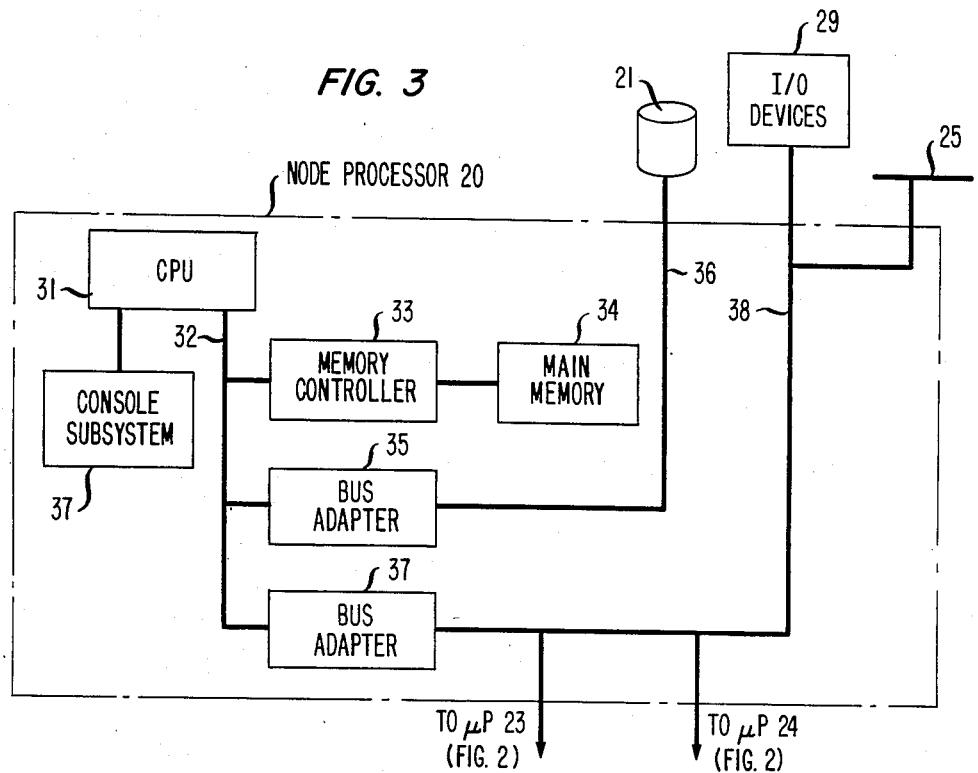
FIG. 3 is a block diagram of a node processor within the node of FIG. 2.

FIG. 3 is a block diagram of an individual one of node processors 20. (Processors 20, 26 and 28 are substantially identical to one another. Thus, although the following discussion focuses on node processors 20, it should be understood to apply to processors 26 and 28 as well.)

At the heart of processor 20 is its central processing unit (CPU) 31, which communicates over a high-speed synchronous bus 32 with main memory 34 via memory controller 33; with mass storage units 21 via bus adapter 35 and bus 36; and with general purpose I/O devices 29 via bus adapter 37 and bus 38. Processor 20 also includes a console subsystem 37 which illustratively comprises an operator's console terminal, a microcomputer and a floppy disk unit. This subsystem serves as the operator interface with the processor and enables the operator to monitor the processor and control it.

Node processors 20 are virtual memory processors. An understanding of the concept of virtual memory will facilitate an understanding of the remainder of this detailed description. Accordingly, this concept will now be reviewed.

I.B.1 Virtual Memory—The Virtual Memory Space

Figure 4:
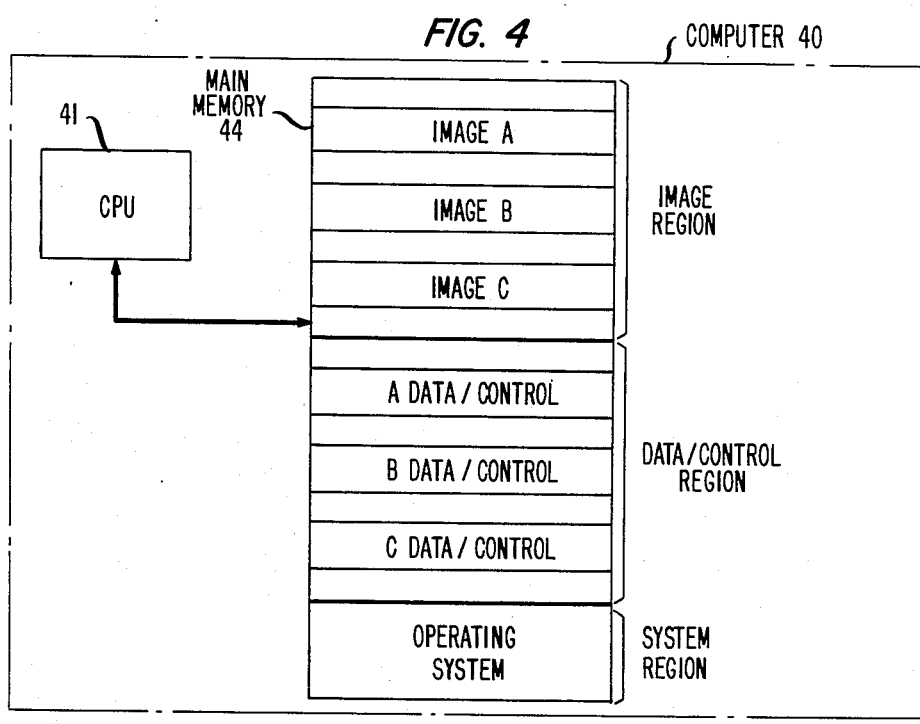
FIG. 4, presented as a pedagogic aid, is a block diagram of a typical multiprogrammed computer.

We begin with a review of the concept of multiprogramming. A multiprogrammed computer is one in which more than one program is stored, or "resident," in the computer main memory at any one time. This is illustrated in FIG. 4, which depicts a computer 40 having a CPU 41 and main memory 44. Three executable machine language programs, or "images," are shown as being resident in the image region of the main memory. Program statements and data must be resident in main memory in order to be acted on by CPU 41, and only one image can actually be executed at any given time in a computer which, like computer 40, has a single CPU. However, by having more than one image resident in main memory, another image is immediately available if, for example, the one that is currently running must go into a "wait" state pending the occurrence of some "event," such as the completion of an input/output (I/O) operation.

Memory 44 also has a data/control region and a system region. Within the former is a data/control area associated with each image in which are stored (a) data generated and used by the image and (b) stacks built during its execution. The system region contains the operating system—an ensemble of machine language code and data that provides (a) system management functions such as the scheduling and allocation of CPU time among the various images and (b) so-called "system services" such as I/O services.

The memory layout of memory 44 is typical of so-called non-virtual memory storage systems in that the entirety of each image and its data are stored in the computer main memory and addresses referenced during execution of the image are the physical addresses of storage located within the memory. By contrast, processors 20, as previously noted, are virtual memory machines. In a virtual memory system, main memory and auxiliary, e.g., disk, storage are combined to give the programmer the illusion that the main memory is vastly larger than it actually is and that this so-called "virtual" memory space is occupied by that programmer's image(s), the associated data and control—principally stack—information and the operating system. The way in which this illusion is effected will now be explained.

Figure 5:
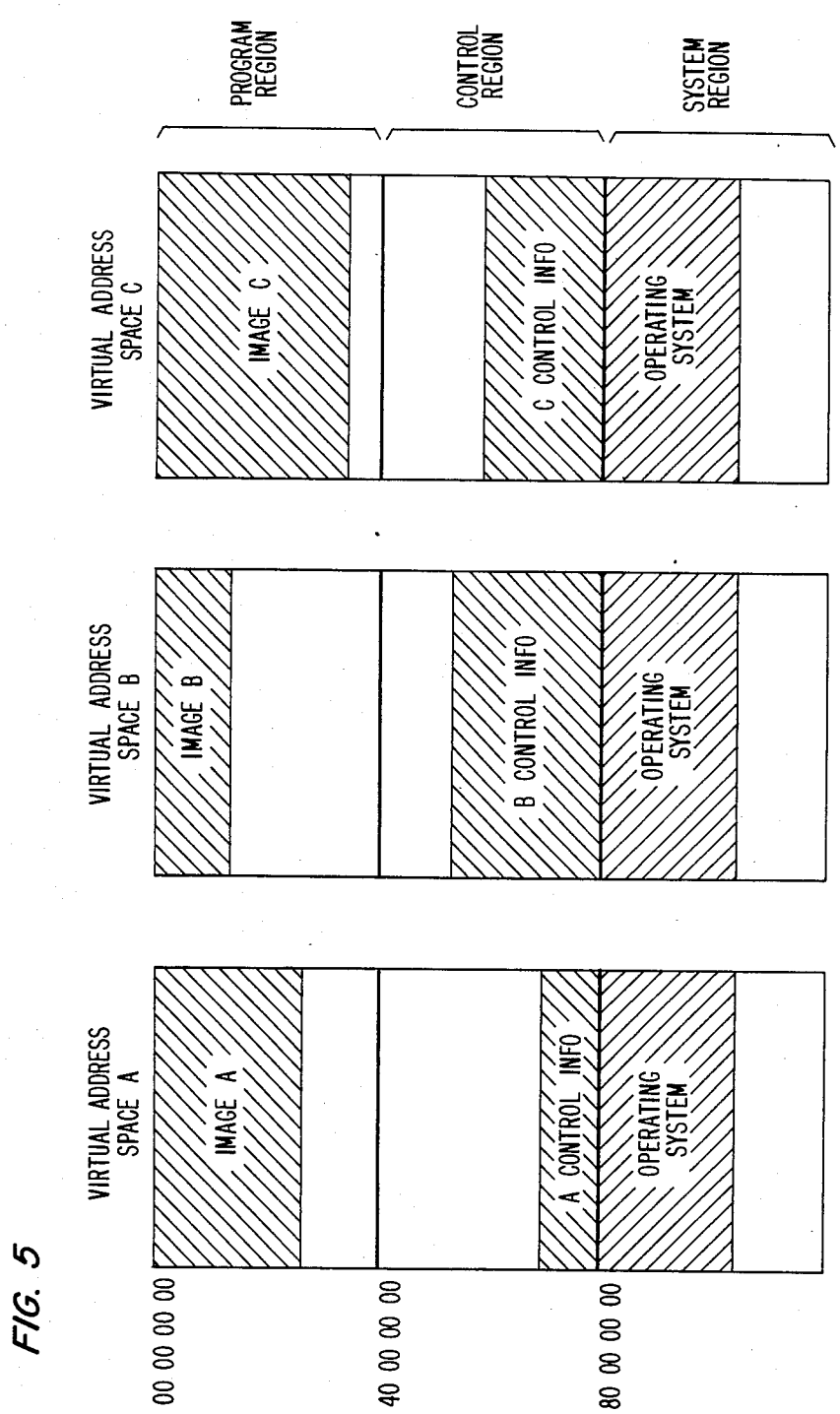
FIG. 5, presented as a pedagogic aid, illustrates the concept of virtual address space.

In a virtual memory system, a so-called virtual memory space is associated with each image. FIG. 5, for example, depicts three virtual address spaces A, B, and C associated with respective images A, B and C. The virtual address space associated with an image is the array of storage locations which appear to be available in main memory. Each virtual storage location within a virtual address space has an associated 32-bit (8-hexadecimal-digit) address. These are the addresses which are referenced by the image and manipulated by the CPU when the image is executing. Note that the same virtual addresses refer to corresponding locations in each virtual address space.

Each virtual address space is divided into program, control and system regions. The program region contains the image and its data and begins at the virtual storage location whose hexadecimal address is 00000000. The control region starts at address 40000000 and contains the control information associated with the image. The system region starts at 80000000 and contains the operating system.

I.B.2 Virtual Memory—The Hardware Mechanism

Figure 6:
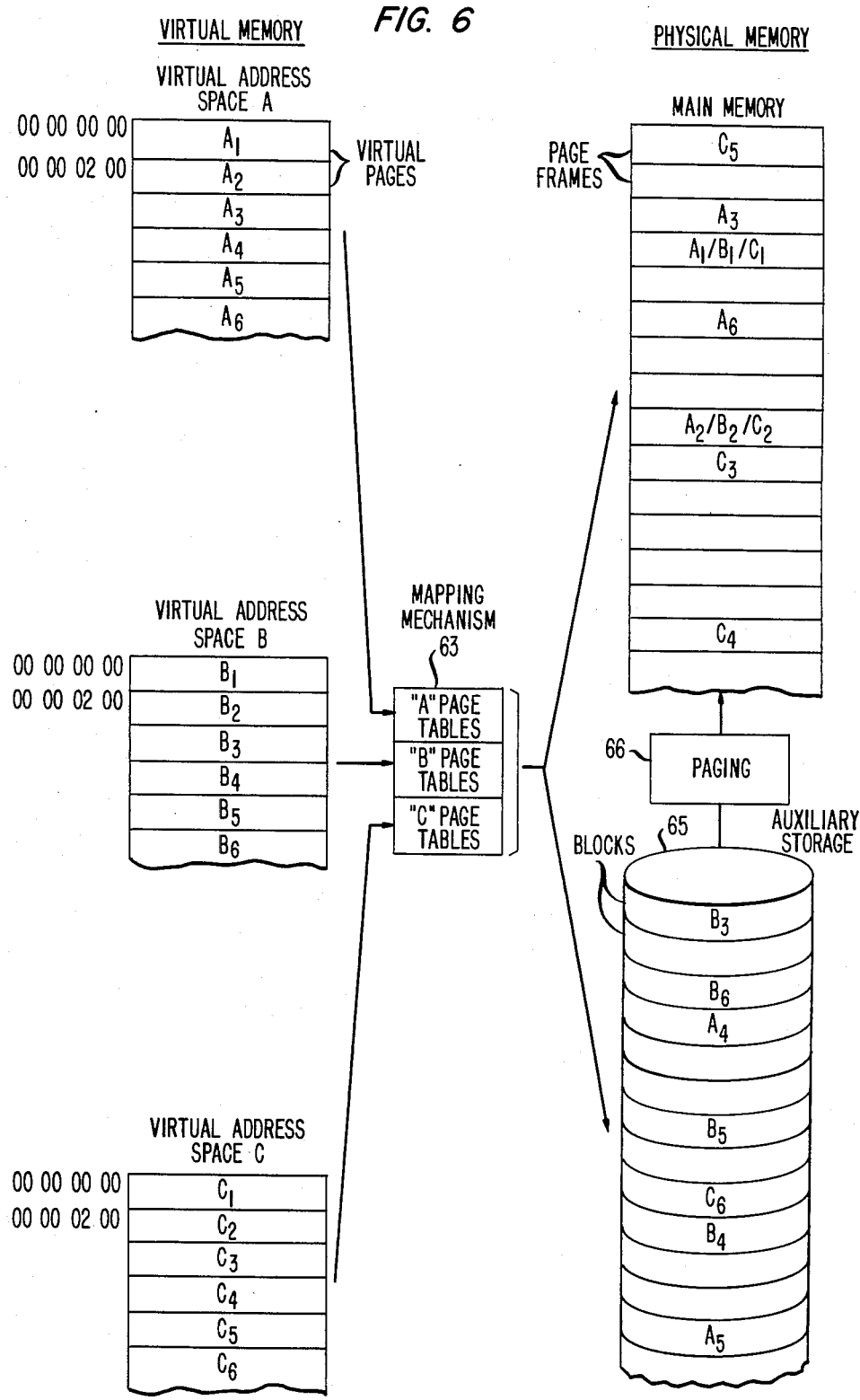
FIG. 6, presented as a pedagogic aid, illustrates the hardware mechanism via which a virtual memory system is realized in a computer.

As shown in FIG. 6, each virtual address space is divided into contiguous-byte segments referred to as pages. Illustratively, each page contains 512 bytes. The first six pages of address spaces A, B and C, denoted $A_1$–$A_6$, $B_1$–$B_6$ and $C_1$–$C_6$, respectively, are explicitly shown in FIG. 6. (All of these are, of course, program region pages.) The physical (as opposed to virtual) main memory of the computer, indicated at 64, is also divided into 512-byte segments, referred to as page frames. Auxiliary storage, indicated at 65, is also organized into 512-byte segments, referred to as blocks. At any given time, only some of the pages of any given virtual address space are actually stored in physical memory. The rest of the virtual pages are held in auxiliary storage. A mapping mechanism within the computer, indicated at 63, maintains so-called page tables for each address space via which it keeps tracks of whether any particular page is resident in main memory or, alternatively, in auxiliary storage.

When a particular virtual location is to be accessed by the CPU, the mapping mechanism determines whether the byte stored in the addressed virtual location (or, more accurately, the page which contains that byte) is then resident in physical main memory. If it is, the mapping mechanism translates the virtual address of that location into the physical address of the main memory location where the byte is stored. That location is then accessed by the CPU and processing continues.

If, on the other hand, the addressed byte is determined to be in auxiliary storage, a so-called page fault occurs. This activates a paging mechanism, indicated at 66, which causes the page containing that byte to be read, or "faulted" into main memory. (This is necessary because, as previously noted, only information in main memory can be directly manipulated by the CPU.) Since the mapping mechanism essentially involves a table look-up function, new pages faulted into main memory can be placed in any available page frame. The process (defined below Sec. II.A.1) in which the image is executing can take up only so many page frames, referred to as the working set limit. If that limit has already been reached when a new page is to be faulted into the working set, the process must relinquish one of its pages—illustratively the one that was least-recently referenced. CPU processing resumes once the desired page has been faulted into main memory.

Advantageously, pages in different virtual memory spaces are readily mapped by the mapping mechanism to the same page frame in main memory at the same time, thus allowing the "sharing" of physical pages. Thus as seen in FIG. 6, pages A1, B1 and C1 are resident in main memory and share a page frame; the same is true for pages A2, B2 and C2. Other pages stored in main memory are pages A6, C3, C4 and C5. All other pages are stored in auxiliary storage 65. Page sharing is used in the present system for the so-called "shared image" (Sec. II.B).

There are several disadvantages to virtual memory system. These relate, principally, to the overhead attendant to its utilization and to the phenomenon known as "thrashing". In general, however, the disadvantages of virtual memory are greatly outweighed by the advantages. These include more efficient use of main memory; the ability to easily accommodate large programs; the insulation of users from one another (resulting from the fact that each image has its own virtual address space); and the ease with which virtual memory space can be allocated.

II. SYSTEM SOFTWARE—ARCHITECTURE

II.A.1 Processes—The Process Concept

We begin our discussion of the system software architecture with the concept of a "process." A process is the total environment in which an image executes and has three components: a virtual memory space, as already discussed, a software context and a hardware context. The software context includes such pieces of information as priorities and privileges allocated to the process, a unique process identifier, accounting information, etc. The hardware context comprises the contents at any given time of the general purpose registers within the CPU (as well as some "hidden" registers within the machine). Whenever execution of the process is suspended, its hardware context is stored in memory before another process gets control of the CPU. When the first process is again allowed to execute, its hardware context is re-stored in the CPU registers. The process can then continue execution at the exact point at which it was interrupted.

Figure 7:
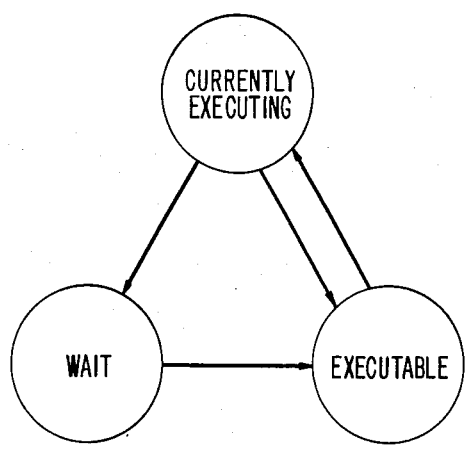
FIG. 7, presented as a pedagogic aid, shows the three states in which processes within a multiprogrammed computer can exist.

At any given time, a process exists in one of three states, as shown in FIG. 7. The process is said to be "currently executing" if program statements of the image are currently being acted upon by the CPU. In a single-CPU processor, only one process can be in this state at any given time. The process is said to be in a "wait" state if execution of the process cannot continue until, for example, some event occurs, such as the completion of an I/O transaction. The process is said to be in the "executable" state when it is ready to execute but cannot because some other process is currently executing. A process enters the executable state when, for example, an event for which it has been waiting occurs, or when it is preempted from the currently executing state by another process having a higher priority.

The concept of a process, as distinguished from an image, is important because it is the process, and not the image, which tells what will happen, and under what constraints, at execution time. For example, two processes may exist in the processor at the same time, each executing the same image on behalf of different users. Consider, for example, a text editor executing in two separate processes on behalf of two separate users. In general, each process will have a different virtual memory space because, even though the image is the same, the data and control information will be different. Each process will also have a different hardware context because, at any given time, each will be executing different portions of the image. Moreover, each process will have a different software context. For example, the processes will, by definition, have different process identifiers and may, in addition, have different priorities, resource allocation quotas, etc.

Figure 8:
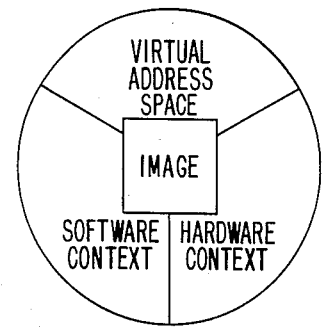
FIG. 8, presented as a pedagogic aid, depicts a symbol used to represent a process within a virtual memory computer.

In order to emphasize the idea that a process is the total environment in which an image executes, a process is sometimes represented by the symbol shown in FIG. 8. In the present description, however, it is convenient, and adequate, to represent a process by depicting its virtual address space.

II.A.2 Processes—Application and Control Layer Processes

Figure 9:
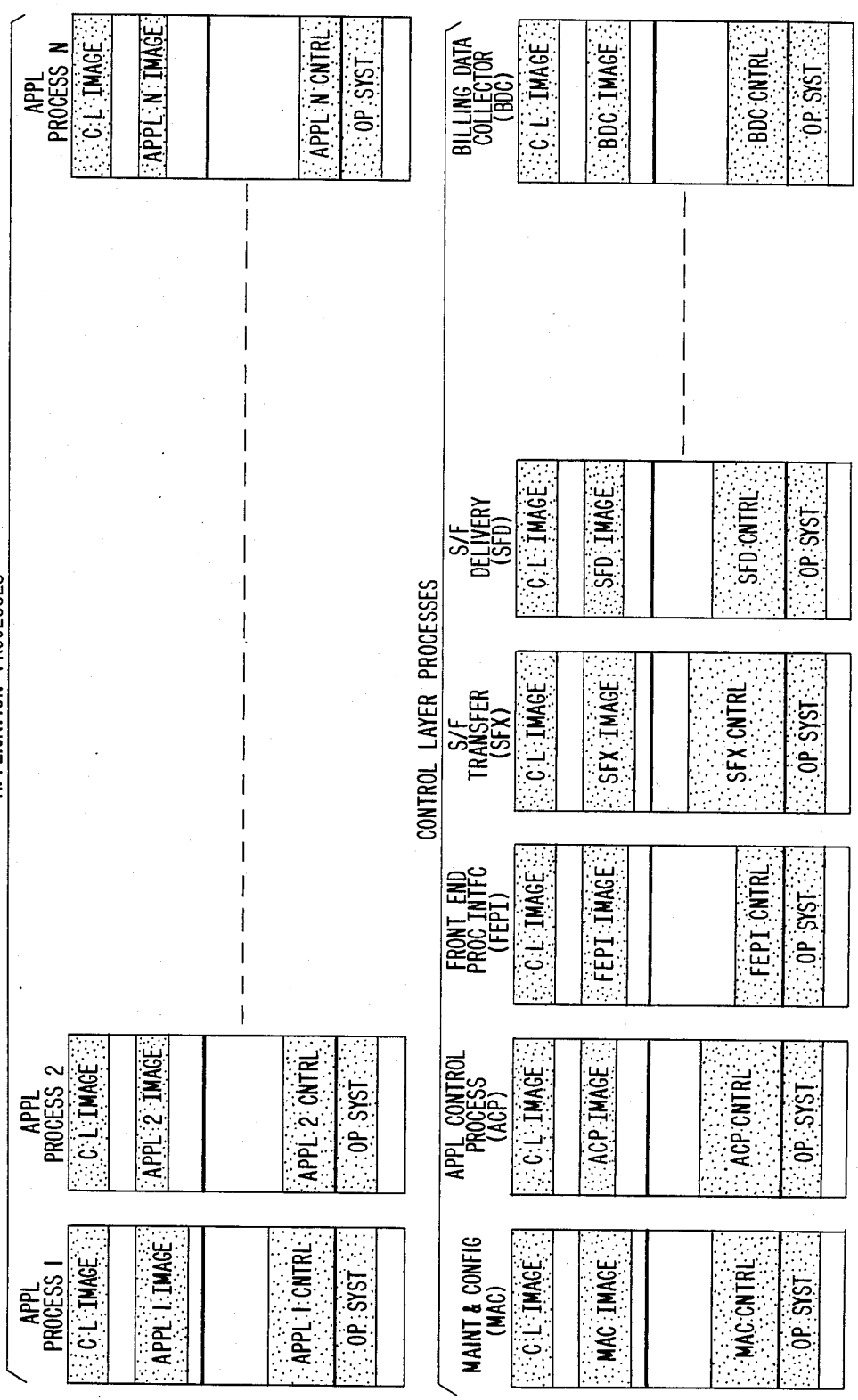
FIG. 9 depicts the virtual address spaces of so-called application and control layer processes which exist within the node processor.

In particular, FIG. 9 depicts the virtual address spaces of a number of processes within one of node processors 20. The processes are illustratively categorized into two types—application processes and control layer processes. Each application process executes an image on behalf of a customer or the vendor in performance of some "useful work." Typical customer application processes execute programs such as payroll and or accounting, database manipulation and file management, text editing, etc. The program code for any particular one of these programs may be supplied totally by the customer, totally by the vendor, or by the customer using software building blocks supplied by the vendor. Typical vendor application processes execute programs such as logon, billing, service provisioning, etc.

The control layer processes execute on behalf of the vendor and each of them manages, or provides some part of, the communications service itself. Each of the control layer processes exists on at least one processor within the node as long as the node is in operation, and many of the control layer processes exist in each of the node processors. FIG. 9 depicts the virtual address spaces of various ones of the control layer processes, which will now be described briefly.

The Maintenance and Control (MAC) process exists within each processor and is the first process to be created when the processor is started up. One of its principal functions is to create the other control layer processes via calls to the process creation service provided by VMS operating system. Other functions include coordination of processor quiescence, termination and switchover. Yet other functions include detection of, and overseeing the recovery from, various hardware and control layer software errors.

The Application Control Process (ACP), which is part of the application control subsystem (Sec. II.B.1), exists within each node processor. Among its functions are to create and terminate all application processes; control the logical environment in which stations, i.e., terminals and hosts, operate; and construct and maintain profiles associated with the various programs running in, and stations communicating with, the processor.

A separate Front-End Processor Interface (FEPI) process exists within each node processor for each front-end processor associated therewith. It serves as the gateway for packets from the front-end processor to the rest of the node.

The Store-and-Forward Transfer (SFX) and Store-and-Forward Delivery (SFD) processes each exist only in the database processor of each node. A store-and-forward operation is initiated when an application process causes a store-and-forward message and its associated control information (destination, grade of service, etc.) to be stored in the database via calls to store-and-forward "primitives" (Sec. II.B.2). The SFX process thereafter "picks up" the message and invokes the internal communications subsystem (Sec. II.B.1) to transfer the message to the SFD process within the destination node. The latter arranges for delivery of the message to the intended destination.

The Billing Data Collector (BDC) process collects billing records generated during the execution, and at the termination, of each customer application process. It also sorts the records and prepares billing activity summaries.

Although not all shown in the drawing, a number of control layer processes—in addition to the SFD and SFX processes—exist within the database processor of each node. These include, for example, an instance of the MAC process, a so-called database work manager, a database storage monitor, and a number of database servers. The virtual address spaces of those processes are structured in the same way as the virtual address spaces of the processes within the node processors.

II.B.1 The Shared Image—Processing Services and Subsystems; Primitives

The program region for each application and control layer process must, of course, include an image whose program code carries out the "useful work" that the process was created to do. As shown in FIG. 9, the program region of each address space includes not only this so-called "process-specific" image, but a second image with which it is weakly linked (as described below). This second image, which is referred to as the shared image, is identical for each process and provides an operating environment for it. In particular, the shared image makes available to the process-specific image a number of communications processing services which, for example, manipulate data associated with the process-specific image. These include services in the following categories: file/database management, application program control, internal (i.e., interprocess, interprocessor and internode) communications, station access and message services. Such services can also be called upon from within the shared image itself.

The software which provides any particular category of communications processing services is referred to as a "communications processing subsystem" or, more simply, "subsystem." Each subsystem includes a set of routines, referred to as "primitives," via which its services are invoked.

Some of the subsystems are totally contained within the shared image. The principal subsystems in this category are referred to as the internal communications, application data transfer and buffer management subsystems. Other subsystems comprise a combination of shared image code with one or more processes (each of which, in turn, includes the shared image within its own virtual address space. The principal subsystems in this category are referred to as the applications control, database manager and store-and-forward subsystems. (The system may include other software "subsystems" which do not provide communications processing services and will not be discussed herein.)

The above-mentioned six subsystems and the functions of some of their primitives will now be described briefly.

The internal communications (IC) subsystem provides a connection-oriented mechanism for intraprocessor, intra-node and inter-node communication of data. The endpoint for an IC connection can be a control layer process, a station call facility (Sec. III.B) or a control layer subsystem within an application process. The IC subsystem includes primitives which enable a process to (a) initiate, splice, forward, redirect and terminate connections, (b) read and write data over them, and (c) obtain various pieces of connection-related information. IC services cannot, in general, be directly invoked by application processes. (The mechanism for controlling access to these and other services is discussed in Sec. II.B.2.)

The application data transfer (ADT) subsystem provides a version of IC services that application processes can use, and its primitives provide services similar to those provided by the IC primitives. ADT further includes code which bills the customer for ADT service usage and screens calls so that, for example, an application process cannot communicate with a control layer process.

The buffer management (BU) subsystem interfaces with the global section file services provided by VAX/VMS to provide other elements of the shared image with a convenient mechanism for obtaining sharing and releasing blocks of physical memory referred to as "buffers." A buffer is "shared" by two processes, for example, by being mapped into the virtual address space of both of them. It is via this mechanism, for example, that the IC subsystem in one process is able to communicate with its counterpart in another process. The BU subsystem also provides a service referred to as buffer "passing." Here a first process fills the buffer with data and then instructs the BU subsystem to (a) map the buffer into the virtual address space of a second process and (b) delete the buffer from its own virtual address space. This mechanism is used, for example, to pass billing information to the above-mentioned Billing Data Collector process. BU includes primitives which enable a process to (a) get a new buffer, (b) initiate the sharing or passing of a buffer, (c) get a buffer which another process desires to share or pass, (d) release a buffer, and (e) obtain various pieces of buffer-related information.

The applications control subsystem provides a logical environment for stations (i.e., terminals and hosts) and application programs. It provides such functions as creation of application processes; reporting of billing data; maintenance of program and station profiles, which are data structures containing useful information about the programs and stations installed in the system (see Sec. III.A.1); and management of application termination screening, which determines for each station and program what other stations and programs will be allowed to communicate with it. This subsystem includes primitives which (a) enable a process to terminate or hibernate itself, (b) install, kill, enable and disable programs and terminals, (c) change the termination screening of programs and terminals, and (d) provide access to the program and station profiles.

The database manager subsystem—much of which is resident in database processor 26—manages the organization of, and controls access to, the database maintained by database processor 26. This subsystem includes primitives which allow a process to (a) open, close, enable and disable storage areas, (b) open, close, create, delete, rename and copy files, (c) access records within files on a validated or unvalidated basis using either relative addressing or indexing, (d) manipulate fields within records, (e) perform so-called "atomic" transactions and (f) perform data validation. Most of the primitives in categories (a) through (e) can be executed synchronously, in which case the task requesting the service is suspended until the action requested has been performed (see Sec. II.C), or asynchronously, in which case the task is not suspended.

The store and forward subsystem provides store and forward message services which are invoked by an application program to transfer data to one or more other application programs in accordance with a specified time schedule. This subsystem includes primitives which (a) enable the transmitting process to insert a message into the store-and-forward facility, and (b) enable the receiving process to obtain or refuse the message once it has been notified of the latter's arrival.

Other subsystems, which will not be described in further detail, relate to such functions as node operations and maintenance and report generation.

The shared image also includes the program code for primitive not strictly associated with particular subsystems. These include, for example, billing primitives.

II.B.2 The Shared Image—Primitive Calls; Subroutines

The call to a primitive does not effect a direct transfer of program control to the code for the primitive. Rather, control passes to a piece of shared image code referred to as the change mode handler. The change mode handler is discussed in detail below (Secs. III.A.6 and III.D). It is desirable, however, to introduce its basic functioning at this point.

A characteristic of the primitives is that they can only be executed within a process which is executing in the so-called supervisor access mode (Sec. II.D). Accordingly, the change mode handler first determines if the process was executing in that mode when the primitive was called. This will be the case if the process is a control layer process or if the primitive was called from the shared image. If this was in fact the case, the primitive is immediately called.

The call to the primitive will otherwise have issued with the process currently executing in the less privileged, user mode. In this case, the change mode handler elevates the process to "supervisor mode" but performs a number of operations before calling the primitive code. In particular, it checks the arguments in the primitive call to determine that the primitive was called correctly and to insure that the caller is not trying to access memory that he is not allowed to. The change mode handler also records certain billing units associated with the use of the primitive, as discussed in more detail below (Sec. III.D). (Some primitives have no associated billing units.)

The change mode handler also performs a privilege check, as will now be explained. Associated with each primitive is a particular one of four privilege levels. A particular one of the four levels is also associated with the particular user logged on to the system. The change mode handler compares these two privilege levels and calls the code for the primitive only if the privilege level of the user is at least as great as that of the primitive that was called. This mechanism provides an advantageous way to limit access by the process-specific images of customer processes to a desired subset of primitives, thereby preventing such process from invoking services that the vendor does not want them to be able to invoke. This mechanism, in addition, provides an advantageous way for the vendor to extend to the customer the ability to restrict to a limited class of users access to such critical primitive-invoked services as installing, enabling or disabling a station or a program, or performing certain data base operations. This is achieved by allocating a particular privilege level to such services and giving the customer the option of specifying which users logging on under the customer's account number will be allowed to invoke them.

In addition to primitives, the shared image may include a package of "pure" subroutines—some of which may be grouped into so-called "run-time libraries"—to which unbilled, unlimited access is to be given to all callers. This is effected simply by allowing such a subroutine to be executed in user mode, as a result of which calls to the subroutine result in a transfer of control directly thereto without invoking the change mode handler.

II.B.3 The Shared Image—Supervisor Services

The shared image also provides a number of "supervisor" services including enforcement of the system of privileges for the primitives; memory allocation; condition handling; event services; subsystem initialization and termination; and the establishment and management of a multiple-thread-of-control, or "tasking," mechanism. With the exception of so-called user event services, as discussed below, and some memory allocation services, access to supervisor services—which are invoked via subroutine calls—is limited to program code executing in the supervisor access mode (Sec. II.D). These services, as a result, cannot be called, for example, from the process-specific image of an application process. (The dual uses of the term "supervisor" in this detailed description, i.e., "supervisor" services and "supervisor" access mode, should not be confused with one another; they relate to different concepts.)

The various supervisor services are described in further detail at appropriate points hereinbelow.

II.B.4 The Shared Image—Overview of Software Structure

Figure 10:
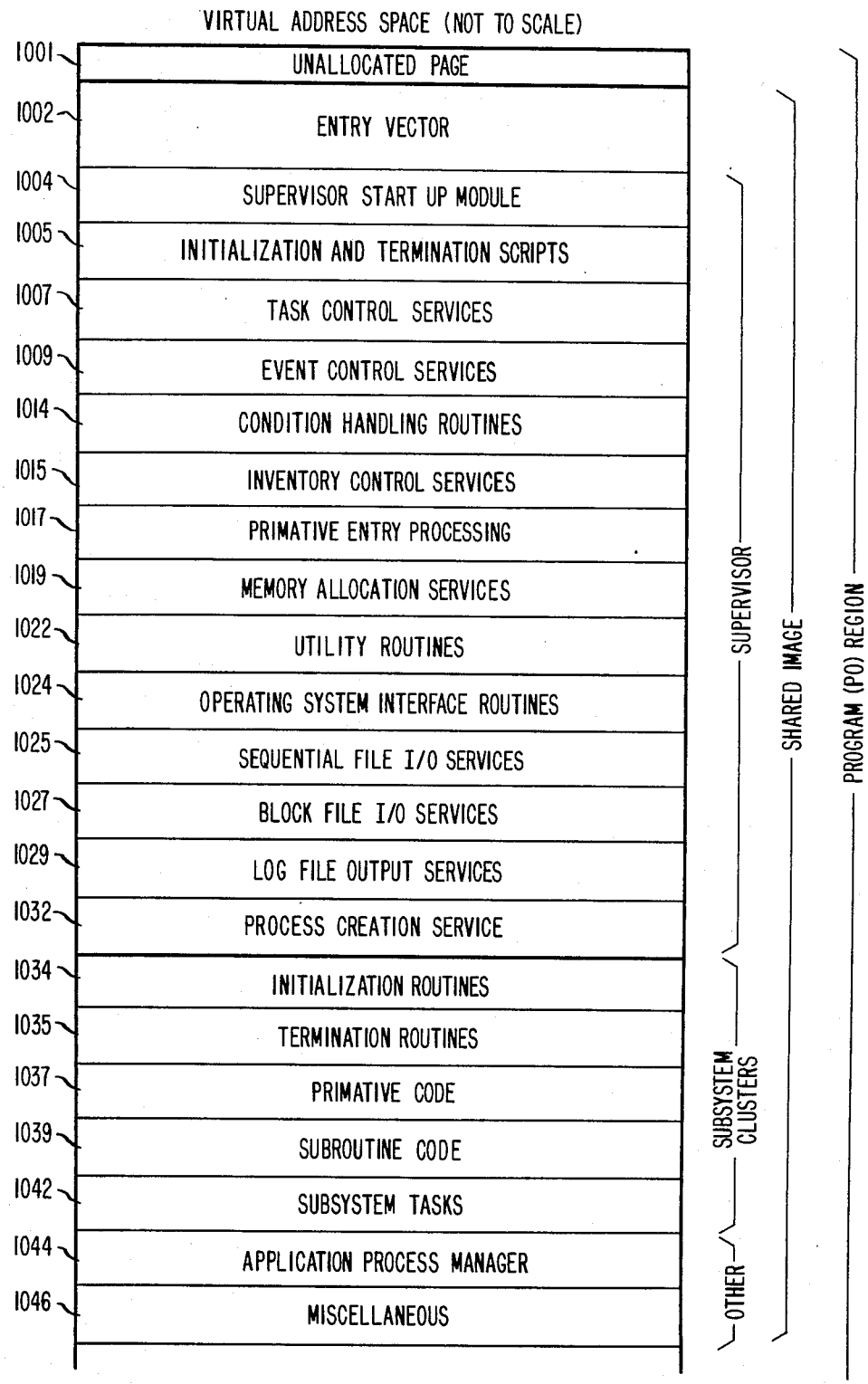
FIGS. 10 and 11, when arranged with the latter below the former, comprise a memory map of an individual one of the virtual address spaces depicted in FIG. 9.
Figure 11:
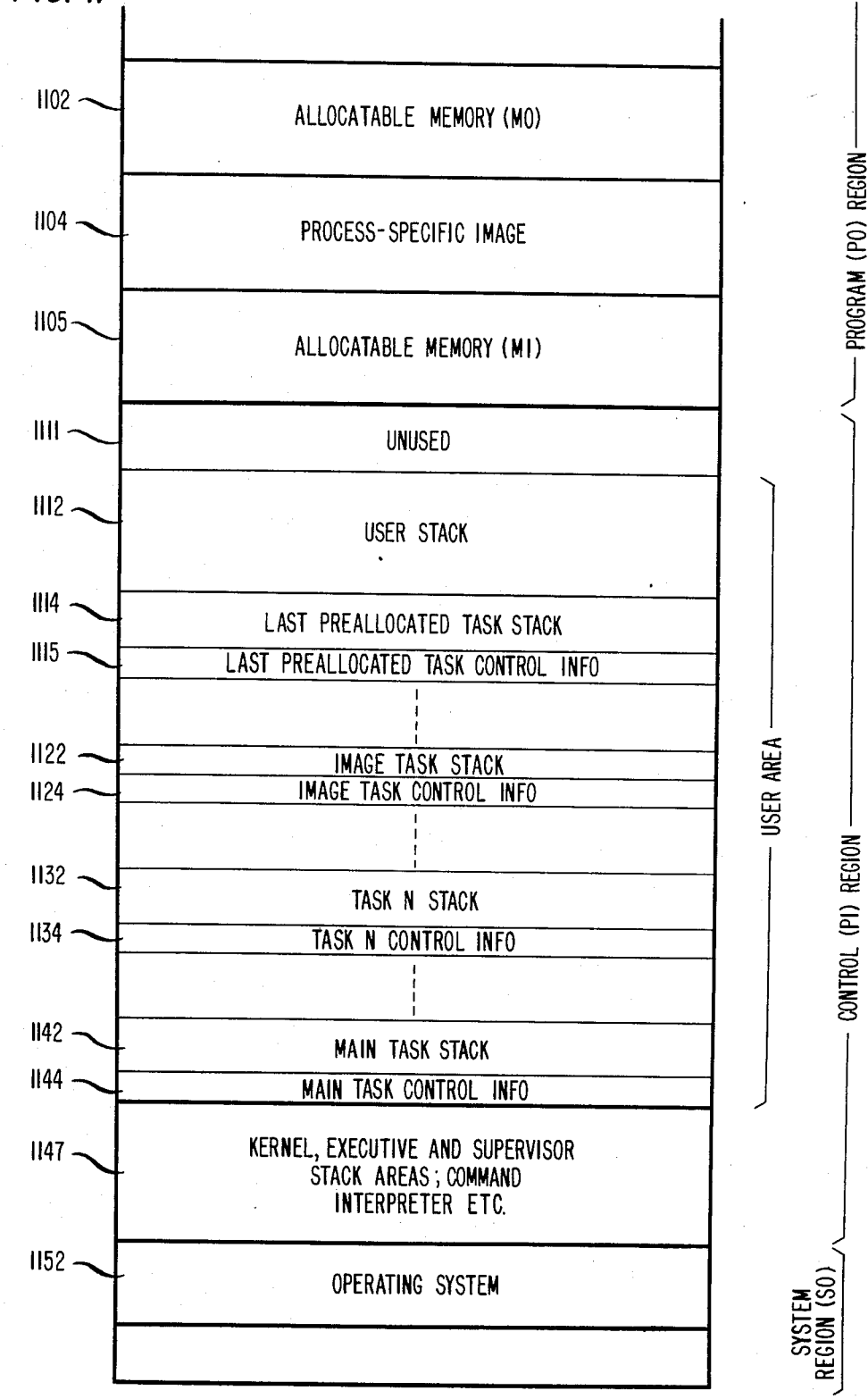
Figure 15:
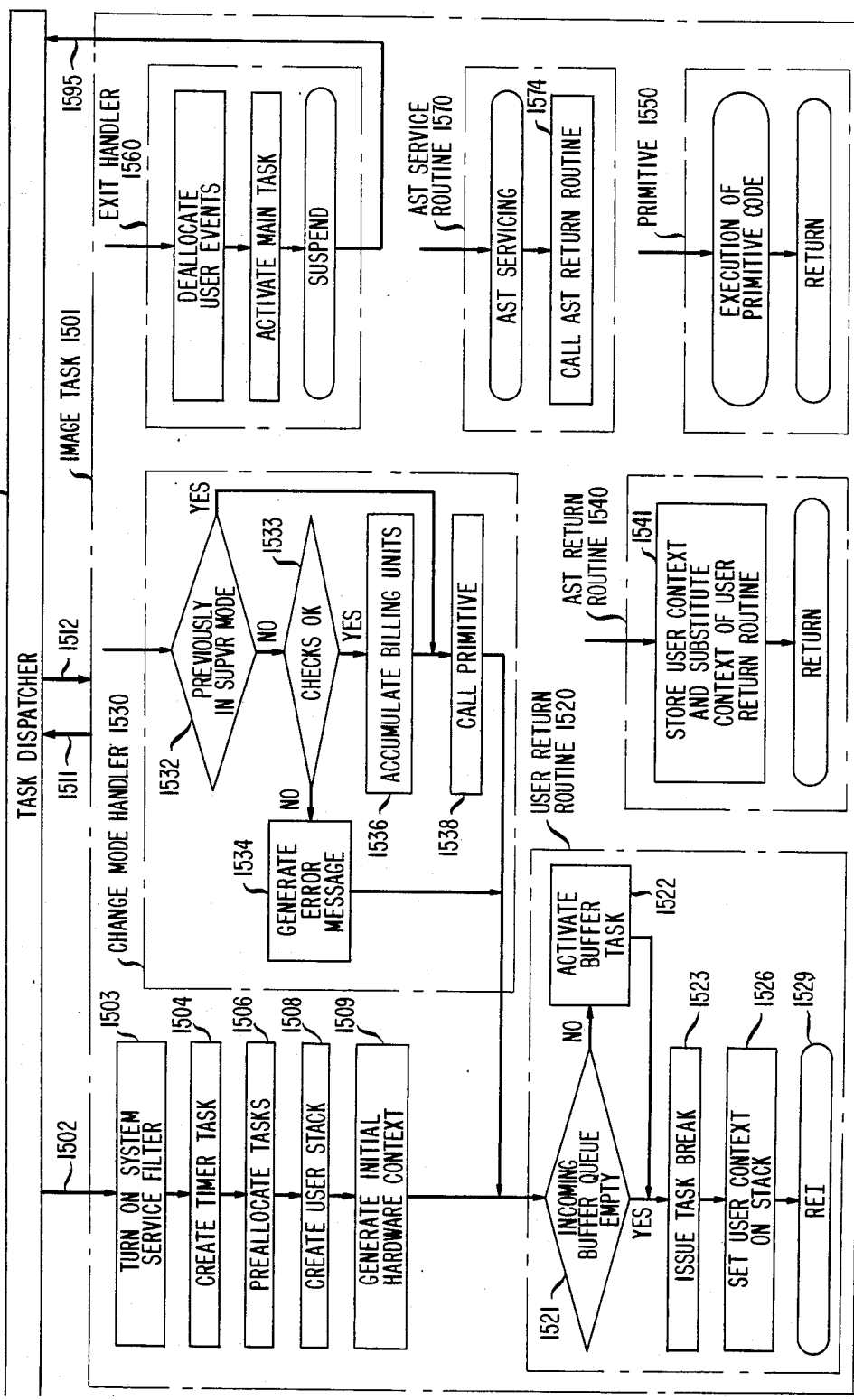
Figure 16:
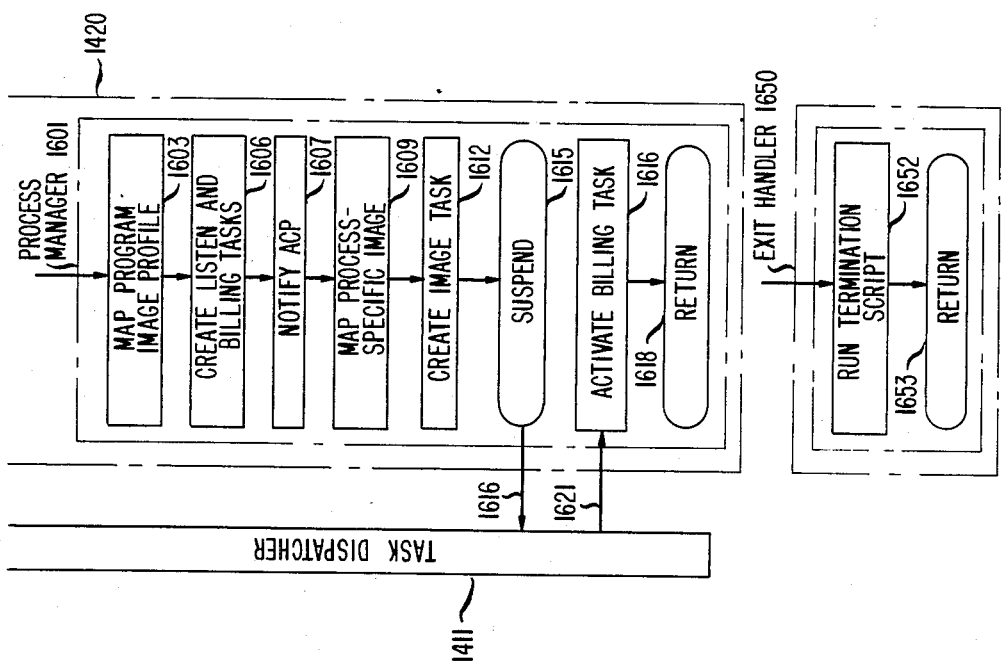

The software structure of the shared image and the way in which it provides the subsystem and supervisor services will now be explained. We begin with a more detailed look at a map of the virtual address space of a typical process, as shown in FIGS. 10 and 11 (with the latter arranged below the former).

We start, more specifically, with the program, or P0, region which regins with an unallocated page 1001. The presence of this page serves as an aid to the debugging of programs by detecting a common programming error—unintentional referencing of the hexadecimal address 00000000.

The unallocated page is followed by an entry vector 1002, which provides a mechanism for weakly linking the process-specific image to the shared image. In particular, when the process-specific image is linked, all calls to primitives and subroutines within the shared image are assigned to particular locations, or entries, within the vector. Each vector entry, in turn, contains code that provides entry to the location within the shared image of the primitive or subroutine itself. The use of such an entry vector is advantageous in that the layout of the shared image can be modified—and thus the locations of the primitive and subroutine program codes can be changed—without requiring the process-specific images to be recompiled. Any change in the location of the code for a particular primitive or subroutine is accommodated simply by changing the address pointed to by the associated vector entry. A more detailed discussion of the entry vector appears below (Secs. III.A.6 and III.D).

The entry vector is followed by the shared image supervisor, which includes a number of compiled programs, or modules, numbered within the range 1004 to 1032 inclusive. The respective functions of the modules are described below (Sec. IV). For the present, it suffices to note that it is the shared image supervisor that provides the supervisor services.

The shared image supervisor is followed by a number of module groups, or clusters, numbered in the range 1034 to 1042, which provide the above-mentioned communications processing services. As a pedagogic aid, the modules within this region are shown in FIG. 10 as being organized into a number of functional blocks. These include the program code which actually implements the communications processing services; initialization routines associated with these services, which routines are called from the shared image supervisor early in the life of the process; and termination routines, which routines are called from the shared image supervisor late in life of the process to provide for orderly process termination.

The subsystem clusters are followed by a group of clusters labeled "other" and numbered in the range 1044 to 1046. These clusters contain the remainder of the shared image program code including, for example, the code for the application process manager (Sec. III.A.4).

The remainder of the program region of the virtual address space includes the process-specific image 1104, which always begins at a predetermined location within the program region, and two allocatable memory spaces. The first of the memory spaces, referred to as M0 space and identified by the reference numeral 1102, extends from the end of the shared image to the start of the process-specific image (which is a fixed predefined address). The second memory space, referred to as M1 space and identified by the reference numeral 1105, extends from the end of the process-specific image to the end of the program region.

The control (P1) region of the virtual address space principally comprises stack areas respectively associated with the four processor access modes used in the VAX 11/780 (Sec. II.D). More specifically, stack areas for three of the four processor access modes—namely the kernel, executive and supervisor modes—as well as storage areas for a command interpreter and other program packages are indicated at 1147. These are of passing interest and need not be considered in further detail.

Of greater interest is the fourth, user, area, within which are allocated (in a manner described below) both a stack and a control area for each task created during the lifetime of the process, as well as a user stack on which the process-specific image operates.

As the term implies, a "stack" may be thought of as a stack of storage locations. The information most recently added to the stack is stored at the "top" (lower virtual addresses) and the information least recently added to the stack is stored at the "bottom" (higher virtual addresses). The manner in which stacks are used need not be discussed herein, this being well within the knowledge of those skilled in the art. The control area is an area of storage which, for some purpose, is more convenient to use than storage in M0 or M1 space or stack space, such as to store information needed by different procedures within a task.

The stack areas are discussed in further detail below (Sec. II.D).

Finally, the system (S0) region of the virtual address space, as previously noted, contains the DEC-supplied VMS operating system and need not be described further.

Most of the remaining figures in the drawing depict various aspects of the flow of execution within a typical application process. The description of the flowcharts in these figures, presented in Section III, will show how the communications processing and supervisor services provided by the shared image are integrated with, and control the execution of, the process-specific image. Preparatory to that discussion, however, it is desirable to discuss the tasking mechanism provided by the shared image supervisor.

II.C.1 Tasking—An Introduction

The shared image supervisor establishes a tasking system within each process whereby program control within the process is passed among entities referred to as "tasks." Associated with each task is a body of program code which is executed whenever program control is given to that task, and whenever program control passes from a task, which can be for any of a number of reasons, as discussed below, its context is saved. Thus each task within a process comprises an "independent thread of control," whose execution can be resumed at any time by restoring its context to the CPU.

Figure 12:
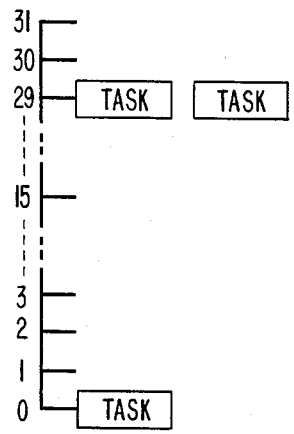
FIG. 12 depicts tasks scheduling queues employed in a tasking system which operates within each process.

Illustratively, the tasks within a process are scheduled in much the same way that processes are scheduled within a multiprogrammed computer. Each task has an assigned priority, between 0 and 31 and, as shown in FIG. 12, a queue of "runnable" tasks is maintained for each priority level. Whenever a task is activated, i.e., made runnable, it is placed at the end of the queue for its priority level, and whenever execution of the currently running task, i.e., the one having program control, is suspended, a "task dispatcher" (Secs. III.A.2 and III.C) passes control to the first task in the nonempty queue having the highest priority.

A task which is either runnable or actually running (there can only be one task running at a time in a process) is said to be "active." If a task is not active, it is said to be "suspended." A task may be suspended because, for example, it is waiting for some event to occur, such as an I/O completion, or it has completed the work that it was activated to do, or simply because the function which the task was designed to perform is not needed at present. Whenever a running task is suspended, its hardware context is saved on its stack, as described below.

Among the advantages of having a tasking capability is that it allows a software system to be designed with a great degree of modularity and permits the various functions performed within the system to be executed quite independently of one another. In particular, tasking greatly simplifies program design and coding because changes can be made in one part of a software system with little, if any effect, on any other part and because execution of the various functions to be performed is only required to be synchronized at specific points specified by the programmer. These are important considerations in the design of large software systems.

A further advantage of tasking is that a process does not necessarily have to suspend its execution, i.e., go into a wait state, when a particular activity within the process must be suspended to, for example, wait for an I/O or other operation to be completed. Rather, the process can suspend the particular task that needs to wait for that operation and then continue executing by picking up the thread, i.e., continuing execution, of any one or more tasks that are then runnable. This approach not only speeds up program execution within the process, but helps to minimize the frequency with which control of the CPU is switched from one process to the next, which is a time-consuming operation. Indeed, tasking is particularly advantageous in a communications-oriented system like this one because such systems engender a substantial number of I/O and other wait-inducing operations.

Calls to the task-creation service provided by the shared image supervisor arise from various quarters and at various times during the life of a process. ("Creating" a task essentially involves setting up a task control block, (Sec. II.C.3) and allocating stack and control areas for it.) For example, some tasks are created in response to calls from within the shared image supervisor to carry out certain shared image supervisor functions, while others are created in response to calls from within the subsystems to effectuate various aspects of the communications processing services.

Tasks can also be created by the process-specific images of control layer processes. For example, the above-described Front End Processor Interface (FEPI) control layer process creates a different task—referred to as a station call facility—to handle the communications with each terminal and host logged on to the associated node processor.

In many cases, a task, once created, exists for the remainder of the life of the process. This is particularly true of the tasks which are created by the supervisor and those which are used within the subsystems. Such tasks never "return." A task such as a station call facility, however, does return to the routine which created (and then called) it. That routine, upon being returned to, terminates the task by, for example, clearing its task control block and deallocating its stack space and control area.

At any given time, only some of the tasks that exist within a process will be active, i.e., running or runnable. Indeed, in most processes most of the tasks will be suspended at any given time.

II.C.2 Tasking—Task Synchronization

The shared image supervisor provides a number of mechanisms for tasks within a process to communicate with one another. The simplest of these mechanisms, referred to as sleep/wake, allows a task to put itself to "sleep" i.e., suspend itself, until some other task wakes it. A simple illustrative application of sleep/wake synchronization could be in conjunction with a message queue. The sending task places a message on the queue and wakes up the receiving task, causing the latter to be placed on a task scheduling queue. When the receiving task actually runs, it processes every message it finds on the queue and then goes back to sleep.

A second task communication mechanism is the semaphore. A semaphore is a data structure which is used, typically, to limit the number of tasks that can have concurrent access to a resource associated with the semaphore. The resource might be, for example, a particular piece of data to which access is to be limited to one task at a time. Or the resource might be the services of the process itself, such as the services of a process which is willing to accept calls from a very large number of terminals but which desires to limit the number of terminals with which it is actively communicating to some smaller number.

The semaphore mechanism is effectuated via a count which is initially set to the number of tasks that are allowed to have concurrent access to the resource in question. Before a task attempts to access the resource, it attempts to decrement the count. If the count remains non-negative, the task proceeds to access the resource. If, however, decrementing the count would cause the count to become negative, the task places itself on a queue associated with the semaphore and suspends itself. When a task which was previously successful in gaining access to the resource is no longer in need of it, that task increments the semaphore count. This action causes the first task in the queue associated with the semaphore to be activated (made runnable), thereby giving that task another opportunity to attempt to decrement the count and thus gain access to the resource.

No mechanism is provided to prevent a task from accessing a semaphore-protected resource directly, i.e., without first attempting to decrement the count. However, since the availability of the tasking services provided by the shared image supervisor is limited to vendor-written programs (via the use of access modes and memory protection, as described below), attempts to circumvent the semaphore mechanism by, for example, malicious users is not a concern.

A third way in which tasks communicate is via so-called "events." This is the principal mechanism by which a task is made aware of the occurrence or completion of particular operations, or "events," in other tasks within a process or, indeed, outside of the process. Completion of an I/O operation is a typical example. Another example is completion by one task of a segment of a procedure that is to be continued by another task.

In order to use the event services provided by the shared image supervisor, a task first "allocates" the event by calling a routine which supplies it with an event number. The task then specifies the event number when, for example, it calls a primitive, subroutine or other "signaler" that is going to cause the event to occur or is otherwise going to become aware, e.g., via an interrupt, that it has occurred. When the event does occur, the signaler "signals" the event by calling a signaling routine, one of whose arguments is the event number. In addition to specifying an event number, a signaler can, when the event is signaled, return to the signaled, or "requesting," task one longword (32 bits) of information, referred to as the signal parameter. The latter may include any type of information previously "agreed on" by the two tasks, including an address which points to an information block.

Meanwhile, the requesting task has had several options available to it. It may have suspended itself, specifying to the event service that it is to be activated when a particular event, or any one of a specified plurality of events, has been signaled. Alternatively, the task may have remained active and simply checked at desired points in its code as to whether a particular event, or any one of a specified plurality of events, has been signaled. The requesting task is also provided with the option of calling an event timer routine which sets a timer for an event. If no signaler has signaled the event when the timer times out, the event is, nonetheless, signaled.

In the present illustrative embodiment, the program code implementing any of the above-described task communication mechanisms calls a task suspension subroutine whenever a running task is to be suspended. This routine, among other things, causes the task's hardware context to be saved on its stack prior to actually suspending the task. The manner in which the context is later restored to the CPU is discussed below (See. III.C).

Like virtually all shared image supervisor routines, the routines which implement the event mechanism used by tasks are not available to, for example, the process-specific image of an application process. An event mechanism can, however, be very useful in the structuring of application programs. Accordingly, the shared image provides a separate set of so-called "user event" routines which can be called from an application program via a set of user event primitives.

II.C.3 Tasking—Task Control Blocks

Central to the operation of the tasking mechanism is a data structure associated with each task referred to as a task control block. This entity is repeatedly referred to by the various routines which manage and operate the tasking system in order to obtain information needed to perform their functions.

Figure 13:
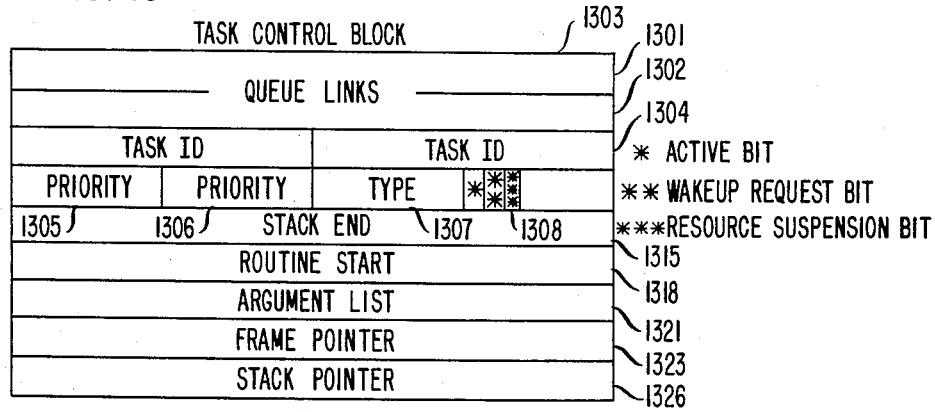
FIG. 13 depicts a data structure, referred to as a task control block, which is used by the tasking system.

In particular, as shown in FIG. 13, the first two entries in the task control block are queue links 1301 and 1302. These are respective longwords (32-bit words) which are used when the task is active to indicate its position in its scheduling queue. One of the queue links points to the location of the task control block for the preceding task in the queue. The other points to the location of the task control block for the succeeding task in the queue. The queue links can also be used to place preallocated tasks (Sec. III.A.5) in a queue established for such tasks.

The task control block also includes a longword which stores task IDs 1304 and 1305. When the task control block is in use, i.e., is associated with an existing task, task IDs 1304 and 1305 are identical. Conversely, whenever a task control block is not in use, it is so "marked" by changing a bit in one of the two IDs so that they are not identical.

The task IDs are followed by three bytes of data. The first of the three bytes, priority 1305, is the current priority of the task. Priority 1306 is a duplicate of priority 1305 which is needed to ensure that routines which change task priority can perform that function properly if interrupted by an asynchronous software trap (AST), which is a kind of interrupt. The third byte, task type 1307, serves as an indication of how many bytes of stack and control area storage are allocated for the task when it was created (See. III.A.3).

Next are three one-bit fields, indicated at 1308. When set, one of these bits indicates that the task has been activated and is, in fact, on a scheduling queue. This bit is checked, for example, before any attempt is made to activate a task to ensure that it is not already active. (Any attempt to activate an already active task might lead to double queueing of the task or other undesired phenomenon.)

Another of the bits in field 1308 is set whenever the task is not suspended but has nevertheless been requested by another task to wake up. As a result of the setting of this bit, the next request for the task to go to sleep will be ignored. This bit is then cleared.

The third bit in this field, when set, indicates that the task is to be suspended if it requests a resource which is not presently available. A typical such resource is a data structure referred to as an event block. A different event block is associated with each allocated event and, at any given time, authorization exists for only a predetermined number of event blocks (and thus events). If, on the other hand, the bit in question is cleared, a "condition" will be signaled instead, causing control to transfer to a "condition handling" routine which may, for example, signal the default resource manager—a task which is described below (Sec. III.A.3).

The remaining elements of the task control block are all longwords. Stack end 1315 is the address of the end of the stack area (and thus also indicates the start of the control area) allocated for the task within the control (P1) region of the virtual address space when the task was created. Routine start 1318 is the address of the start of the program code which the task is to execute. Argument list 1321 is the address of the list of arguments that are to be used in execution of the task. Frame pointer 1323 and stack pointer 1326 are the values of those pointers which were saved from the last time the task in question lost program control. The stack pointer, more particularly, points to the last-referenced storage location on the stack, while the frame pointer points to the location within the stack of the most-recent "call frame"—a data structure used to save and restore registers when, for example, subroutines are called and return.

II.D Processor Access Modes/Stack Areas

In order to complete this discussion of tasking, and to lay further groundwork for the description of the flowcharts, we not introduce the notion of processor access modes. These are four processor access modes used in the VAX 11/780. These are (from most-to-least-privileged) kernel, executive, supervisor and user modes. At any given time, a processor executes in one of these modes, as identified by a field in its processor status longword, the latter being an element of the hardware context of the process. Each page of a virtual address space has an associated "protection code" which defines whether a process executing in any particular access mode is allowed to (a) read the page, (b) read and write the page, or (c) neither. Thus, for example, a page having a particular protection code may, for example, be able to read or written by a process executing in kernel mode; read, but not written, by a processor executing in executive or supervisor mode; and neither read nor written by a process executing in user mode. A page having another protection code may, for example, be able to be read or written by a process executing in any access mode.

Additionally, different stack pointers are maintained by the VAX hardware for each access mode. Thus when a process is executing in supervisor mode, for example, the so-called stack pointer register within the CPU holds the supervisor mode stack pointer. When the access mode is changed to, for example, user mode, the current values of the supervisor mode stack pointer is saved and the last-saved value of the user mode stack pointer is loaded into the stack pointer register.

As previously noted, the VAX hardware maintains a different stack area within the control (P1) region for each processor access mode. The protection code for the pages comprising the various stack areas are assigned such that a process executing in a particular access mode is able to access the stacks associated with that access mode and any lower access mode but is not able to access stacks associated with any higher access modes.

In the present illustrative embodiment, in particular, the supervisor mode stack pointer is used to access locations in two stack areas. Up until the time that the main task is activated, the supervisor mode stack and frame pointers are used to access a supervisor stack within region 1147. Thereafter, they are used to access the stacks maintained for each task within the user area. In particular, one of the jobs of the task dispatcher prior to transferring control to a task is to retrieve the current values of the stack and frame pointers for that task from its task control block and to load them into the appropriate CPU registers so that those values become the current supervisor mode stack and frame pointer values. This is discussed in further detail below (Sec. III.C).

The user area also includes a user stack 1112 on which the process-specific image of an application process operates employing the user mode stack and frame pointers. The user stack is also discussed in further detail below (Sec. III.A.5).

Finally, it may also be noted that the P1 region includes a large "unused" area 1111 which cannot be accessed.

III. SYSTEM SOFTWARE—EXECUTION FLOW

III.A.1 Application Processes—Process Creation Scenario

We are now in a position to examine the flow of execution of a process, beginning, in particular, with the flow of execution of an application process, as indicated in FIGS. 14–17 (when arranged as shown in FIG. 18).

The flow of execution depicted in the flowchart assumes that certain operations have already occurred. It is assumed, in particular, that a user has already logged onto the system from one of terminals 10a and is in communication with the Front End Processor Interface (FEPI) process (FIG. 9). The user has specified a particular program image that she desires to run and has also specified a set of arguments for the program. The request to run the program has been forwarded by the system to the application control process (ACP) (FIG. 9) which has determined that the particular user is authorized to access the program file in question and that a process embodying the program in question does not exist in the node processor at this time. The ACP has, therefore, called a primitive within the shared image which, in turn, has called the VMS process creation service. The latter has been informed that the image to be mapped into the virtual address space of the new process is the shared image.

The ACP process has also generated a so-called process creation string and a process creation service within the shared image, invoked by the ACP program code, has placed the process creation string in a VMS "mailbox" where it can be accessed by the new process once it begins to execute. The process creation string includes a number of data items that the new process will need, including an identification of the program, i.e., process-specific, image specified by the user (stored somewhere in the database); customer account and service ID numbers associated with the user; an indication that the process to be created is an application process; and a pointer to a data structure in the database referred to as the program image profile. The latter, which has already been accessed by the ACP program itself and will also be needed by the new process, contains such information as the customer account and service ID numbers under which the program was installed in the system; an indication of who is allowed to run the program or, if it is already running, to communicate with it; and the desired grade of service, which ultimately translates into a VMS priority under which the process will execute.

III.A.2 Application Processes—Initial Exeuction

Execution of the newly-created process (whose program (P0) region, to this point, contains only the shared image) now begins. As already noted, virtually the entire shared image executing in supervisor mode, and, indeed, the shared image is to begin execution in that mode. However, VMS creates all processes in user mode. Moreover, it does not provide a mechanism for a process to change directly from user mode to supervisor mode. VMS does, however, provide a mechanism for a suitably privileged process to change to executive mode, and ACP creates all processes with this privilege. Moreover, a process is allowed to lower its access mode at any time. Thus, the first action of the new process is to establish itself in supervisor mode, as indicated at 1401 in FIG. 14, by first changing to executive mode and then lowering itself to supervisor mode.

The next initialization step, as indicated at 1402, is to initialize memory structure, i.e., the memory structure of the virtual address space. This includes, for example, initializing the routines which will be called throughout the life of the process to allocate memory and which will initialize lookup structures in M0 and M1 space in response to calls from (a) the remainder of the shared image and (b) the process-specific image.

As indicated at 1404, the shared image supervisor then creates and schedules a so-called main task, which is itself indicated at 1420. As will be seen shortly, the principal functions of the main task are (a) to oversee the bulk of the initialization of the shared image, (b) activate the process-specific range, and (c) terminate the process.

As with any task, creating the main task essentially involves creating a task control block for it and allocating stack and control areas for it. The stack and control areas for the main task are, in particular, indicated at 1142 and 1144, respectively, in FIG. 11. Scheduling the task simply involves placing it on the task scheduling queue associated with its task priority.

At this point, control is transferred to a piece of program code referred to as the task dispatcher, which is indicated at 1411. The function of this piece of code is to pass control among those of the tasks existing in the system that have been activated, i.e., made runnable. It does this by searching the task scheduling queues whenever it is invoked and passing, or transferring, program control to the first task in the non-empty queue of highest priority. To this point, only the main task is on a scheduling queue. Indeed, it is the only task that exists. Accordingly, the task dispatcher transfers control to it, as indicated by arrow 1412.

III.A.3 Application Processes—Main Task

In the first step executed by the main task, the change mode handler described above (Sec. II.B.2) is declared, as indicated at 1421. The change mode handler, which is indicated at 1701 (FIG. 17), is a piece of program code within the shared image. "Declaring" the change mode handler simply means indicating to VMS that it is to automatically transfer control to this particular piece of code whenever a change-mode-to-supervisor instruction is thereafter encountered during program execution. As already seen and as is described in further detail below (Sec. III.D), this is one of the mechanisms used to enforce a system of privileges for the shared image primitives.

As indicated at 1423, the main task now proceeds to define four basic task types, which differ only in that different-sized stack and control areas, predefined by the shared image supervisor, are allocated to them. (The process-specific images of control layer processes can also define the stack and control area sizes of up to four "custom" task types.) The task type is specified when the task is created and, as noted above, an indication of same is stored in the task control block for that task. Advantageously, allowing only a relatively small number of task types simplifies the management of the storage allocated for tasks. Although not indicated in the drawing, an initial maximum allowable number of tasks of each basic type is also established at this time via the inventory control mechanism discussed below (Sec. IV).

Next, the above-described process creation string is read from the VMS mailbox in which it was stored by the ACP process. Most, if not all, of the information in the process creation string is used by any given process at different points throughout its lifetime. The main task, however, is interested only in one piece of information—the process type (e.g., control layer or application). As also indicated at 1426, the process type is used, in turn, to determine the identity of the so-called process manager, as discussed below (Sec. III.A.4).

The ensemble of all tasks created during the life of the process—with the exception of the main task and the image task (to be described)—are shown in FIG. 14 as comprising subsidiary tasks 1450. The first two of these—default resource manager 1451 and lost signal task 1452—are now created by the main task, as indicated at 1429, via calls to a task creation service provided within the shared image. These tasks implement respective supervisor functions. In particular, the function of the default resource manager, which may be activated, for example, by an event signalled from the inventory control software (Sec. IV), is to authorize an increase in the inventory of such resources as tasks of a given type or signal or event blocks (used by the event mechanism) when preallocated limits for such resources run out. The function of the lost signal task is to generate an error to the user if a user event is signaled from the shared image but the event has already been deallocated by the user.

The above-mentioned task-creation service, upon completing the creation of a task, always activates it, i.e., makes it runnable, and then calls a routine which causes a "task break." A task break interrupts execution of the currently running task and invokes the task dispatcher. Thus, if any tasks of higher priority than the one currently running are scheduled when the task break occurs, those tasks will be allowed to run. Both the default resource manager and lost signal task have a task priority of 31, while the main task has a priority of 11. Thus, the task break invoked upon the creation of each of these tasks caused control to pass thereto from the main task. At this point, of course, the services of neither the default resource manager nor the last signal task are required. However, this first opportunity to run is used by each task to initialize itself so as to be ready to execute when it is next activated. The task then suspends itself—typically to wait on an event. Control is thus returned to the main task.

The heavy arrows 1413, 1414, 1441 and 1442 denote the numerous transfers of control that occur between the main task and the subsidiary tasks (including those described below) as the tasks are created. Arrows 1441 and 1442 also denote the numerous transfers of control to and from the subsidiary tasks that occur after execution of the image task has begun.

A supervisor mode exit handler is now declared, as indicated at 1431. When the process-specific image calls the VMS EXIT service, VMS transfers control to a user-mode exit handler, if one has been "declared," i.e., identified, by that image. After the user mode exit handler executes, VMS elevates the process to supervisor mode and transfers control to the supervisor mode exit handler declared at 1431. The supervisor mode exit handler itself is in two pieces, which are indicated at 1650 in FIG. 16 and at 1740 in FIG. 17, respectively. Its function is described below (Sec. III.A.7).

The main task now runs a so-called initialization script, as indicated at 1433. The initialization script is a sequence of calls to initialization subroutines which initialize the environment in which the communications processing services will execute. Each process type utilizes a different subset of the communication processing services. As a result, a different initialization script is provided for each. In this way, initialization is customized for the type of process—in this case, application process—being created.

The functions performed by the initialization subroutines include, for example, initialization of parameter values, initialization of queues, generation of various data structures and creating a number of subsystem tasks, indicated at 1455, which implement various subsystem functions. For example, the internal communications (IC) subsystem includes a task which contains most of the internal communications software, that task being activated by events signalled by either the buffer management subsystem or by the so-called "session layer" primitives via which the internal communications services are invoked. The application data transfer (ADT) subsystem includes a task which is activated in response to events signalled from the IC subsystem when connections to other processes are made and torn down and which thereupon signals corresponding user event to the process-specific image. The ADT subsystem also includes a task which is activated hourly to issue ADT billing records to the Billing Data Collector process.

The buffer management subsystem includes a task which, as described below (Sec. III.A.5), is activated whenever the so-called incoming buffer queue is found to be empty. The database manager subsystem includes a task within each node processor process which communicates, via the internal communications subsystem, with a counterpart task within a so-called server process executing in the database processor, thereby providing access to the database itself. This task is activated, for example, by an event signalled by various database primitives.

Additionally, the store-and-forward subsystem includes a task which waits on an event signalled by the internal communications subsystem and which, when it executes, signals a user event indicating to the process-specific image that a store-and-forward message awaits delivery to it. (The process-specific images of the store-and-forward transfer and delivery processes also create tasks to carry out the functions of those processes.)

By way of example, the stack and control areas for the $n^{th}$ subsystem task are shown explicitly in FIG. 11 at 1132 and 1134, respectively.

III.A.4 Application Processes—Process Manager

As indicated at 1436, the process manager, which was determined in step 1426, is now called. One of the principal functions of the process manager is to invoke a supervisor service which, in turn, invokes a VMS service which will map the process-specific image into the virtual address space of the process. Indeed, in the case of control layer processes, the process manager does little, if anything, else. The process management requirements for application layer processes are more complex, however. Accordingly, different process managers are used for each process type.

The process manager for application processes, which comprises a part of the application control subsystem, is indicated at 1601. It begins its execution at 1603 by mapping the above-mentioned program image profile from a so-called global section file into the local address space so that a copy of same is readily available to the process.

The process manager then creates two tasks—a listen task and a billing task—as indicated at 1606. The function of the listen task, which is indicated at 1461, is to receive control transactions from the application control process (ACP). A typical such transaction is an instruction to abort the process. The function of the billing task is to issue CPU usage billing records to the Billing Data Collector (FIG. 9) via billing primitive calls. These records are issued on the hour during the life of the process as well as just prior its termination and include the following information: the so-called network standard address (NSA) of the program being billed, the NSA of the program of terminal which activated the program being billed, the grade of service (discussed above), CPU usage (in 10 ms units), the time that the process-specific image was activated, and the time the billing record was generated. (In addition to CPU usage, the customer is billed for such services as ADT and store-and-forward services, and use of so-called demand storage in the database. Billing records of such services are issued to the Billing Data Collector directly by the subsystem involved.)

As indicated at 1607, the process manager now notifies ACP that the process is now ready to be put in touch with the customer's terminal. ACP, in due course, will invoke a so-called "redirect" primitive, causing the internal communications connection from the customer to be redirected from ACP to the newly-created process.

As indicated at 1609, the process manager, at this point, calls a shared image routine referred to as the "run image" routine. The parameters in the call to this routine includes the image name, the argument list and the process type. The run image routine includes a call to a VMS service which causes the process-specific image to be mapped into the virtual address space of the process.

III.A.5 Application Processes—Invention: The Image Task

As already described, the processes within a node processor includes tasks which implement supervisor and/or subsystem functions, thereby providing various data manipulation and other services to the process-specific image. In accordance with the invention, the processes also include at least one task—referred to as the "image task" which manages execution of the process-specific image. In particular, the image task controls the vesting of program control in the process-specific image and it is via the image task that program control returns from the process-specific image. As will be seen, this approach advantageously integrates the two principal activities carries on within a process—execution of the process-specific image and execution of software which, for example, provides data communication and/or processing services to the image. Such integration results from the fact that these activities are all controlled by tasks which execute within a common tasking environment.

In accordance with a feature of the invention, program control is temporarily taken from the process-specific image and vested in the image task whenever at least particular tasks are activated as the result of an action of the process-specific image. A typical such action is the calling of a primitive that activates a task.

This approach is advantageous in that, for example, it is guaranteed that a task break can be issued (by the image task) before control is returned to the process-specific image. Thus all tasks activated as the result of an action of the process-specific image which have a higher priority than the image task are given an immediate opportunity to run. (The image task has the lowest priority of any task in the present embodiment so that all tasks activated as a result of an action of the process-specific image will run before control returns to the image task and thus to the process-specific image.) Overall, this approach advantageously ensures that services requested by the process-specific image, e.g., via a primitive call, are provided expeditiously.

In accordance with a further feature of the invention, program control is vested in the image task whenever the process-specific image calls at least those primitives whose execution may make a task runnable. Such "task-activating" primitives thus execute in the image task rather than in the process-specific image. (Indeed, program control is vested in the image task in the present embodiment whenever the process-specific image calls any primitive.)

A particular advantage of having at least the task-activating primitives execute in the image task relates to synchronization of the execution of the process-specific image with the execution of primitive-activated tasks. Assume, by way of example, that the process-specific image has called a database primitive which has, in turn, activated the above-mentioned database task. Assume, further, that execution of the process-specific image is not to resume until the function provided by the primitive is complete. This, in turn, cannot happen until the processing performed by the database task is complete. Since the primitive executes in the image task, such synchronization is readily achieved by having the code which implements the primitive call a "wait-for-event" routine after the database task is activated. This causes execution of the image task—and thus execution of the process-specific image—to be suspended at least until the database signals the event on which the image task is waiting.

In addition to primitives, various AST service routines, as described below, also activate tasks in the present embodiment, and, in accordance with a further feature of the invention, program control is vested in the image task no later than the end of execution of any such routine, i.e., before program control is returned to the process-specific image. (In the present embodiment, more specifically, all routines which service supervisor mode ASTs, i.e., ASTs whose delivery was requested from the shared image, execute in the image task.) Thus any tasks made runnable by an AST service routine are, again, assured of an immediate opportunity to run via an image-task-issued task break.

As indicated at 1612, the image task, whose stack and control areas are respectively indicated at 1122 and 1124 in FIG. 11, is created at this time—illustratively by the above-mentioned run image routine. Although a task break is issued upon the creation of the image task, as is the case with all tasks, the image task does not run at this time because, as noted above, it is created with priority "0," whereas the main task has a priority of "11." However, as indicated at 1615, the process manager now suspends the main task—illustratively by attempting to perform a "down" operation on a semaphore whose value has been pre-set to zero. Indeed, the main task will remain suspended until this semaphore count is incremented from within the image task when execution of the process-specific image is complete. Even though the image task has priority "0," it is the only other active task at this point. Thus, suspension of the main task causes the task dispatcher to pass, or transfer, control to the image task, as indicated by arrows 1616 and 1502.

Execution of the image task begins, as indicated at 1503, with the turning on of a so-called system service filter, which may be included as a service of the operating system. This filter "traps" any "change-mode-to-executive" or "change-mode-to-kernel" instruction executed hereafter, thereby thwarting any attempt by a user to bypass the change mode handler (Sec. III.A.6).

The image task then proceeds to step 1504, at which it creates a timer task, which is itself indicated at 1465. In order to fully understand the function of the timer task, we must digress momentarily to outline some fundamental characteristics of the internal communications (IC) and buffer management (BU) subsystems.

When one process wishes to establish communications with another, the IC subsystem within the first process invokes a so-called buffer request primitive. The BU subsystem responds by mapping a block of physical memory of a size specified in the primitive call into the virtual address space of the process. BU then returns to IC an identifier for this memory block, or "buffer," as well as the location thereof within the virtual address space. Having thus "obtained" the buffer, IC within the first process then invokes another primitive to request that the buffer be shared with the second process. BU responds by placing an entry in a previously-established "incoming buffer queue" associated with, and accessible by, the second process. When the incoming buffer queue is next examined by the second process and is found to be non-empty, an event is signaled which causes a BU task within the second process to be activated. This task, when it runs, maps the buffer into the virtual address space of the second process and assigns it a buffer identifier for use by the second process. The buffer identifier and buffer size are thereafter passed to the IC subsystem within the second process. The IC subsystems within each process are thus provided with a communication medium via which information can be passed.

As will be seen, the incoming buffer queue is examined by a process whenever a primitive is executed or return is to user mode from an AST interrupt, or when the task dispatcher is entered. For most processes, this is a sufficiently frequent occurrence to ensure that the incoming buffer queue is examined often. It is desirable, however, that the queue be regularly examined even in the absence of primitive calls or ASTs. This is the function of the timer task. Whenever it is activated—which, illustratively, is once every twenty seconds—the timer task examines the incoming buffer queue and, if necessary, activates the BU task.

The image task now proceeds to a task preallocation step and a user stack creation step, indicated at 1506 and 1508, respectively. An understanding of the latter will facilitate explanation of the former. Accordingly, they will be discussed in reverse order.

As previously noted, the user stack is the stack on which the process-specific image operates using the user mode stack and frame pointers. As seen from FIG. 11, where it is indicated at 1112, the user stack is located within the VMS-defined user area of the control (P1) region. The starting point, or "bottom" of the stack begins at the end of the last task stack. "Creating" the user stack essentially involves defining that starting place.

Virtually no limit is placed on the size to which the user stack can grow. Thus once that stack has been created, there is no practical way to allocate stack and control areas to any new tasks one might desire to create thereafter. It is for this reason that the task preallocation step is provided. This step creates a number of "shell" tasks up to the limit that was authorized for each task type when the task types were defined. These tasks are placed in a preallocated task queue and whenever the task creation service is called from this point on, the task control block and stack and control areas of a shell task from this queue are assigned to the new task. The stack and control areas for the last preallocated task are indicated at 1114 and 1115, respectively, in FIG. 11.

At this point, the process is ready to transfer control to the process-specific image. First of all, as indicated at 1509, an initial user hardware context is generated. This involves generating initial values for the processor status longword, the program counter and the R0 and R1 registers. A jump is then made to a user return routine, which is indicated at 1520. This routine provides a standard mechanism for transferring, or returning, control to the process-specific image from the image task, and, as will be described, from primitives and ASTs.

As indicated at 1521 and 1522, the user return routine first checks the above-described input buffer queue and activates the buffer management (BU) task is the queue is non-empty. Indeed, a buffer containing a first communication from the user's terminal may have already been queued up. We will assume, however, that the queue is empty at the present time. The user return routine then issues a task break, thereby invoking the task dispatcher. We will assume that no tasks other than the image task are active. The previously-generated user context is then set on the image task stack and then an REI instruction is executed, as indicated at 1526 and 1529, respectively. The latter causes the user context on the image task stack to be loaded into the appropriate registers within the CPU and, substantially concurred therewith, for the processor access mode—which has heretofore been supervisor mode—to be reduced to user mode. This causes control of the computer to be passed by the image task to, and thus vested in, the process-specific image.

III.A.6 Application Processes—Execution of Process-Specific Image

Figure 17:
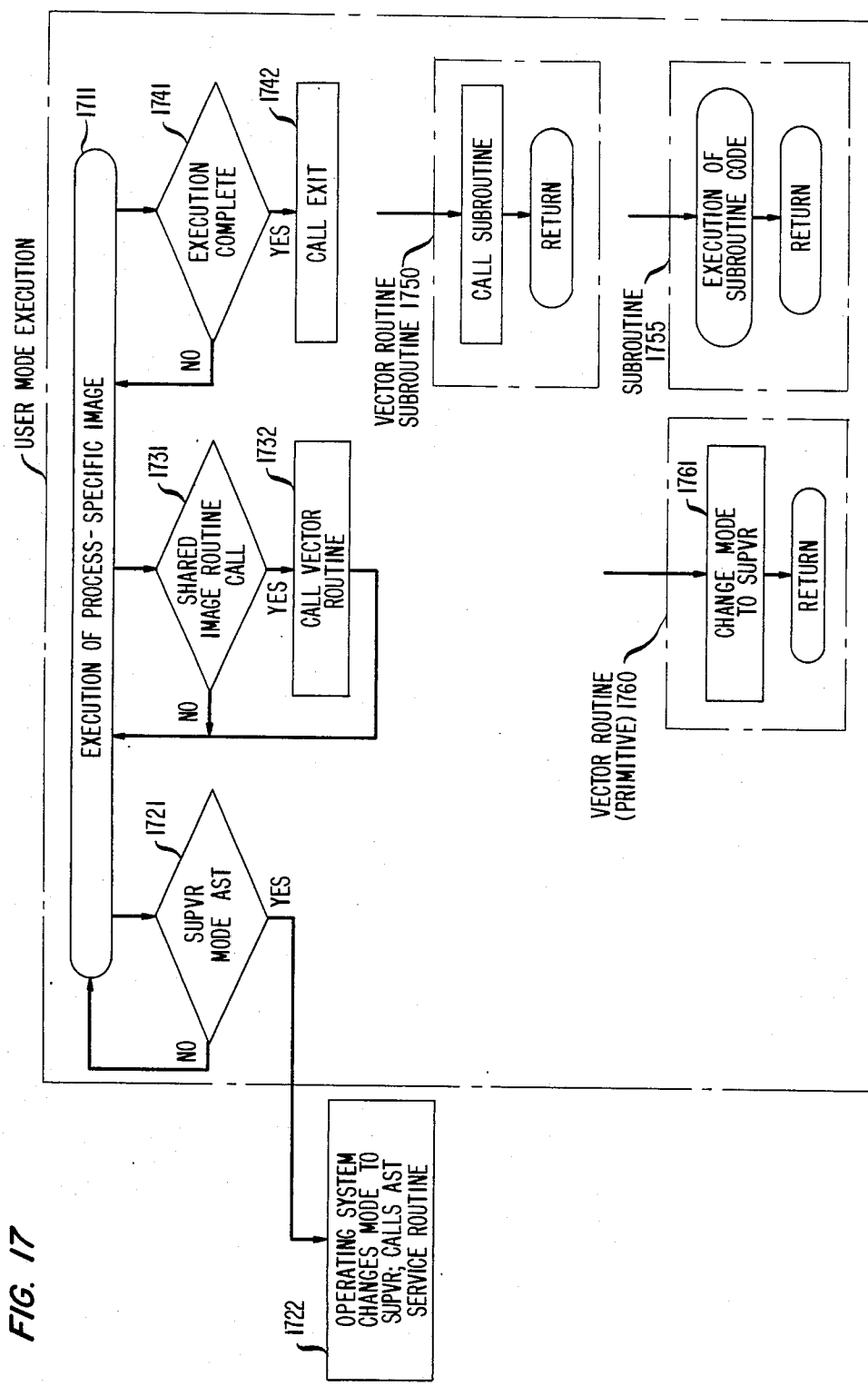

User mode execution is indicated in FIG. 17 and execution of the process-specific image, in particular, is indicated at 1711. As previously noted, program control returns to the image task in the present embodiment whenever a primitive is called and whenever a supervisor mode AST is delivered, as will now be described.

The AST mechanism provides in a way for the process to be notified of an occurrence outside of the process. Typical such occurrences are the completion of an I/O operation, the timing out of a timer, or the insertion of a message for the process in a VMS mailbox. When the AST is "delivered" to the process, as indicated at 1721, execution of the process-specific image is interrupted and the user context is stored in a data structure maintained for the purpose. An AST service routine associated with the AST in question is then called (by the operating system). This routine is designed to take action appropriate to the particular occurrence, which action might include, for example, the signaling of an event, or the performance of a semaphore operation. Either of these could cause a task to be activated.

Typically, the request that the AST be delivered will have emanated from the shared image so that the process would have been executing in supervisor mode at that time. As a consequence, as indicated at 1724, delivery of such a so-called supervisor mode AST not only causes the operating system to call the AST service routine, but, immediately prior thereto, elevates the process to supervisor mode, thereby returning program control to the image task. Thus, the interrupt service routine executes within that task, as indicated at 1570.

Conventionally, a "return" instruction is executed at the end of an AST service routine. This causes the user context to be restored and program execution to be resumed at the point at which it was interrupted. In the present system, however, it is first determined whether the AST service routine has made any tasks runnable. If it has not, the user context is, in fact, restored. If, however, the AST service routine has made one or more tasks runnable, as will now be assumed, user return routine 1520 is to be invoked so that a task break can be issued and those tasks given an opportunity to run. To this end, as indicated at 1574, the AST service routine calls an AST return routine, which is itself indicated at 1540. As indicated at 1541, the first step of this routine is to take the user context information from the above-mentioned data structure and store it away elsewhere. A context associated with the user return routine is then substituted for the user context. When a "return" is now invoked by the AST return routine, control is not returned to the process-specific image, as would have been the case if the data structure had not been "tampered with," but, rather, to the user return routine.

After the task break executed within the user return routine (at 1523) causes all runnable tasks to run (this being ensured by the fact that the image task has priority "0"), the user context stored away by the AST return routine is set on the image task stack, as indicated at 1526. The subsequent REI instruction, indicated at 1529, lowers the process to user mode and causes program control to be passed back to, and thus vested in, the process-specific image. Execution of the latter then resumes at the point at which it was interrupted by the AST.

As indicated at 1731, another possibility is for the process-specific image to call a shared image routine—either a pure subroutine or a primitive. As previously noted, such a call results in a transfer of control to entry vector 1002 and, in particular, to a routine within the vector associated with the routine that was called.

If the called routine is a pure subroutine, the entry vector routine is of the type indicated at 1750. The vector routine calls the subroutine, an archetypal subroutine being indicated at 1755, and when the subroutine completes its execution, it returns to the vector routine. The latter, in turn, returns to the process-specific image. Thus it is seen that pure subroutines execute within the process-specific image.

The pages of memory which contain pure subroutines are accessible by processes executing in all processor access modes. Thus, as just seen, no mode change is required to call such routines. The code for primitives, however, is executable only by processes executing in at least supervisor mode. As a result, the vector routines associated with primitives differ from those associated with pure subroutines.

In particular, the vector routines associated within primitives are of the type indicated at 1760. The routine begins with an entry mask (not shown, but discussed below (Sec. III.D)) followed by a change-mode-to-supervisor instruction, as indicated at 1761. Execution of this instruction does, in fact, change the process to supervisor mode, and thereby returns program control to the image task. At the same time, however, it causes control to be transferred to change mode handler 1530, which was declared in step 1421. As indicated at 1532, the change mode handler first determines whether the process was executing in supervisor mode when the primitive was called, as will be the case for control layer processes and application processes in which the primitive was called from the shared image. If this were to be the case, the change mode handler would immediately call the primitive at step 1538. Our assumption here, however, is that the primitive caller is the process-specific image, which was executing in user mode when it called the primitive. Accordingly, execution continues at step 1533 at which the change mode handler performs a number of primitive checks. In particular, as discussed in further detail in conjunction with FIG. 20 (in Sec. III.D), the change mode handler determines, for example, whether the particular user has privilege to invoke the primitive in question. It also insures that the caller is not trying to access memory that he or she is not allowed to and, to the extent possible, also performs error checks on the arguments supplied in the primitive call. If there is a problem in any of these areas, an error message is generated for return to the user, as indicated at 1534. If there is no problem, however, control passes to step 1536, at which billing units associated with the primitive area are accumulated in the above-mentioned program image profile. The billing units represent an estimate of the CPU time that will be used by any control layer process or processes in furtherance of the service that the primitive provides. (Many primitives have no such associated billing units.) The accumulated billing units are added to the actual CPU time by billing task 1463 whenever it issues a billing record (Sec. III.A.4). The primitive itself is then called.

An archetypal primitive is indicated at 1550. When called, the primitive code executes and then returns to the change mode handler. The change mode handler then jumps to the user return routine in which, again, the incoming buffer queue is checked and a task break is issued in order to allow any nonscheduled tasks to run. Such tasks may include the buffer task, if it was activated in step 1522, and/or any tasks which were activated during execution of the primitive, with the heavy arrows 1511 and 1512 denoting transfers of control between the image task and the task dispatcher.

The user context set on the image task stack at step 1526 is the context that obtained when the change-mode-to-supervisor instruction was executed within vector 1760. Thus, substantially concurrent with the lowering of the process to user mode upon execution of the REI instruction at step 1529, the vesting of program control in the process-specific image is initiated. In particular, program execution resumes at the point at which the process was elevated to supervisor mode— namely vector routine 1760. The vector routine, in turn, returns to the process-specific image so that program control is once again vested therein.

III.A.7 Application Processes—Process Termination

When the process-specific image has completed its execution, as indicated at 1741, it calls the VMS EXIT service as indicated at 1742. If a user mode exit handler was previously declared by the process-specific image, VMS passes control to it. Otherwise, or in any event, when the user mode exit handler completes execution, VMS elevates the process to supervisor mode, thereby returning program control to the image task, and transfers control to the supervisor mode exit handler declared in step 1431. More particularly, that portion of the exit handler indicated at 1560 now gets control.

In particular, the exit handler first deallocates any outstanding user events so that if any user event is hereafter signaled from the shared image, the lost signal task will be activated rather than having the shared image attempt to signal an event that will never be responded to. The exit handler then increments the semaphore discussed above in conjunction with step 1615, thereby activating the main task. The exit handler then suspends the image task.

The task dispatcher is thus invoked (for the last time), as indicated by arrow 1595, and it transfers control to the now-activated main task. As indicated by arrow 1621, the thread of control of the main task picks up where it left off, i.e., within the process manager. The latter activates the billing task to generate a final billing record and returns to the main thread of the main task, as indicated at 1616 and 1618, respectively.

The next step of the main task is to, again, call EXIT, as indicated at 1437. A different portion of the previously-declared exit handler, indicated at 1650, is now invoked. The latter runs a termination script for the shared image, as indicated at 1652. The termination script comprises a sequence of calls to subroutines which cause such functions to be performed as the closing of any open database files, the tearing down any existing IC connections to other processes, etc. The exit handler then returns to the main task, as indicated at 1653. The main task thereupon calls a VMS service which terminates the process, as indicated at 1438.

III.B Control Layer Processes

The flow of execution of a control layer process is similar to that of an application process and need not be described in detail, except to note the principal differences between them.

For example, all control layer processes are created by the MAC process (FIG. 9) except, of course, for the MAC process itself.

In addition, the process manager for control layer processes substantially comprises only steps 1609, 1615 and 1618 and, as a result, there are no listen and billing tasks. Moreover, the image task transfers control directly to the process-specific image rather than to the code which executes steps 1503, 1504, 1506, 1508 and 1509. Thus, the timer task is not created, nor is a user stack created. Rather, the process-specific image— which, it will be remembered, executes in supervisor mode—operates on the stack of the image task. Moreover, since there is no user stack, task preallocation is not needed.

As in an application process, execution of the change-mode-to-supervisor instruction with each vector routine will invoke the change mode handler even if the process is already executing in supervisor mode. However, as previously noted, the change mode handler, when invoked within a control layer process performs no billing nor any privilege or argument checks. Rather, it immediately calls the primitive in question. Moreover, when the primitive returns, the change mode handler immediately returns to the vector routine which called it rather than to the user return routine. Indeed, the latter is not needed because the process-specific image of a control layer process, being vendor-written, can be relied on to check the incoming buffer queue and to issue task breaks at appropriate points in the program code. For the same reason, AST return routine 1540 is not used. The AST service routines, rather, return directly to the process-specific image.

Since a control layer process executes in supervisor mode, it does not need to employ the user event mechanism. Accordingly, the user event deallocation step within exit handler 1560 is not needed. (Indeed, for the same reason, lost signal task 1452 is not needed. It is more convenient, however, to create this task and never use it than to provide a different task creation procedure at step 1429 for control layer and application processes.)

More generally, the fact that a control layer process executes in supervisor mode means the process-specific image thereof executes in the image task and that all shared image services are available to that image including, for example, the ability to create tasks. A notable example of this occurs in the Front End Processor Interface (FEPI) process in which a separate task—referred to as a station call facility—is created to handle the communication with each logged-on station, i.e., terminal or host.

III.C Task Dispatcher

Figure 19:
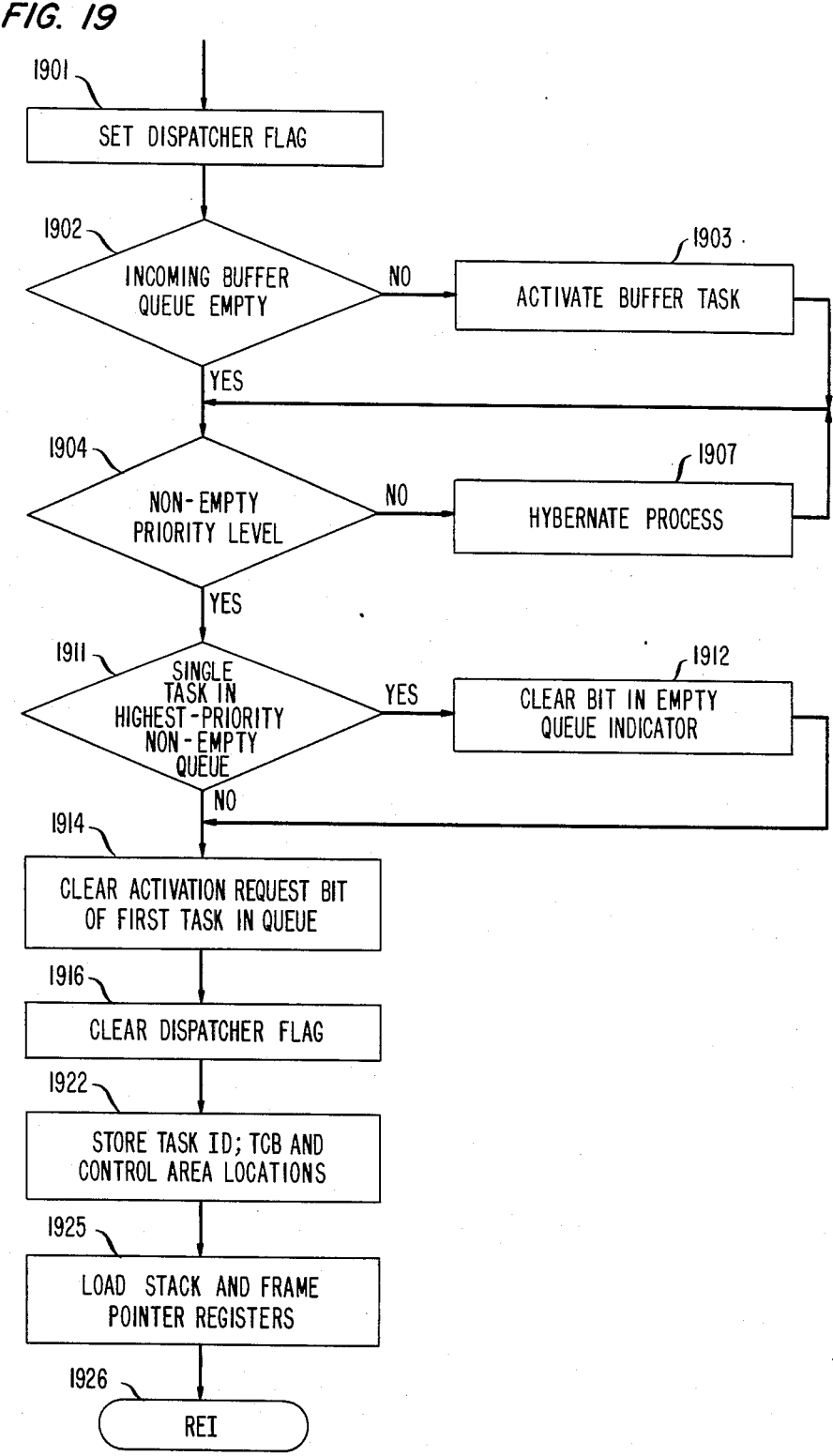
FIG. 19 is a flowchart depicting the execution flow of the task dispatcher shown in FIGS. 14-16.

FIG. 19 is a flowchart of task dispatcher 1411. This piece of code is invoked, for example, whenever a task break is issued, as previously described, or whenever any action is taken which results in an interruption of the execution of the task currently running.

As indicated at 1901, the first operation of the task dispatcher is to set a dispatcher flag, the purpose of which will be explained shortly. The task dispatcher then determines, as indicated at 1902, whether the incoming buffer queue is empty and, if it is not, activates the buffer task, as indicated at 1903. (See Sec. III.A.5 for a discussion of this mechanism.) The task dispatcher then determines whether any of the task scheduling queues is non-empty, as indicated at 1904. It does this by examining a 32-bit word (not shown) referred to as the non-empty queue indicator mask. Each bit in this word is associated with a different one of the queues, with the bit being set if the associated queue is non-empty, and cleared if the queue is empty.

If there is no non-empty queue, i.e., no task is runnable, the process is put into a wait state by calling a VMS service which "hibernates" the process, as indicated at 1907. The process will remain in this state until it is woken as the result, for example, of the delivery of an AST whose service routine (a) makes some task runnable and then (b) issues a "wake" request for the process.

We are now in a position to understand the function of the dispatcher flag. Whenever an AST service routine activates a task, i.e., makes it runnable, it checks this flag. If the flag is cleared, the flow of the execution will always be such as to guarantee that the dispatcher will be invoked (as the result of the issuance of a task break at step 1523), thereby giving the task a chance to run. Thus, nothing further need be done. If, on the other hand, the flag is set, the process may be in hibernation or about to hibernate, i.e., between steps 1904 and 1907. In this case, the AST service routine issues a wake request. If the process is actually in hibernation, it wakes and step 1904 is repeated. If the process was about to hibernate, the hibernate request issued at step 1907 is ignored.

The logical flow just described could, of course, be effected without using the dispatcher flag simply by having each AST service routine which can activate a task always issue a wake request. Use of the flag, however, avoids the issuance of unnecessary wake requests, which are time-consuming.

If at least one task scheduling queue is non-empty, control is to be transferred to the first task in the highest-priority such queue. Preparatory thereto, a determination is made, as indicated at 1911, as to whether that task is the only one in its queue. If it is, the associated bit in the empty queue indicator is cleared, as indicated at 1912. This is, of course, necessary because after control passes to the task, that queue will be empty. The activation request bit within the task control block for the task is also cleared, as indicated at 1914, followed by a clearing of the dispatcher flag, as indicated at 1916.

At this time, as indicated at 1922, the locations of the task control block and control area for the task, as well as its task ID, are copied into predefined storage locations so that they can be easily accessed. As indicated at 1925, the stack and frame pointer values for the task in question, are then read from its task control block and loaded into the appropriate CPU registers.

The context of the task is now restored in the CPU. In particular, an REI instruction is now executed, as indicated at 1926. At the top of the stack for the task in question, which is pointed to by the just-loaded stack pointer value, are the values of the program counter (PC) and processor status longword (PSL) that obtained when the task last executed. The REI instruction causes those words to be popped off the stack and loaded into the corresponding CPU registers, thereby causing the task to resume execution the point at which it was interrupted. That most recent point of execution will invariably have been a task suspension routine whose last-previous actions included storing on the task's stack the values of, not only its PC and PSL, but also the values of the general purpose registers. Upon resumption of its execution, this routine's first action is to execute a "return," which causes the register values to be popped off the stack and restored in the CPU, thereby completing restoral of the context.

III.D Change Mode Handler Primitive Checks

Figure 20:
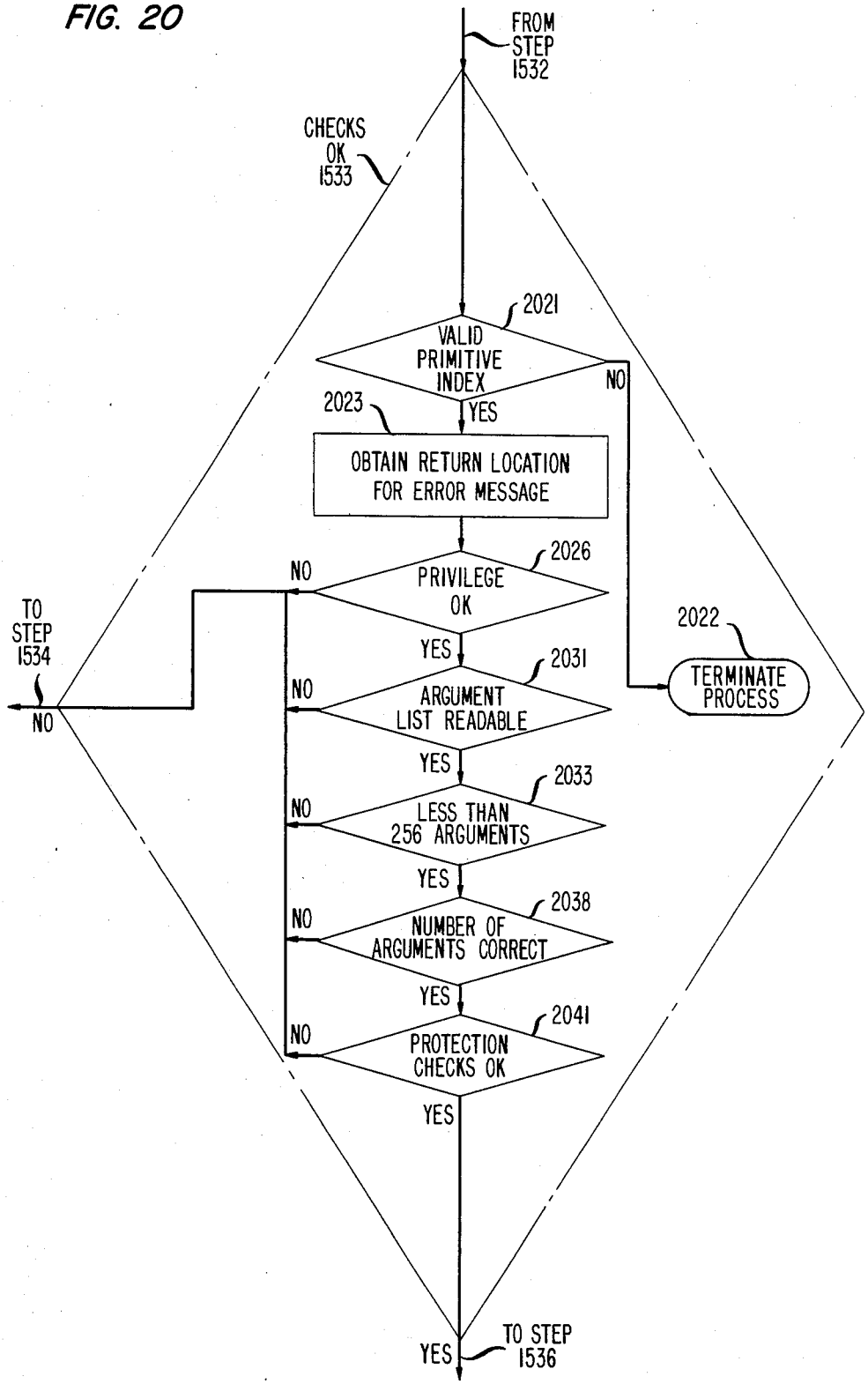
FIG. 20 is a flowchart depicting the execution flow of the primitive check step within the change mode handler shown in FIG. 18.

As previously noted, change mode handler 1530 performs a number of checks at step 1533 to determine whether the caller has privilege to invoke the primitive in question, to insure that the caller is not trying to access memory that he or she is not allowed to and, to the extent possible, to perform error checks on the arguments supplied in the primitive call. FIG. 20 is a flowchart showing how these various checks are performed. Before this flowchart is described, however, it will be helpful to first refer to FIG. 21, which is a detailed drawing of entry vector 1002.

As seen from the figure, entry vector 1002 is comprised of a number of regions, the first of which contains vector routines 2110. When a program to be executed in this system is compiled, each primitive and subroutine call becomes an instruction which effects a transfer of control to the vector routine associated with that primitive or subroutine. (This was described below in connection with archetypal vector routines 1760 and 1750, respectively.)

Figure 21:
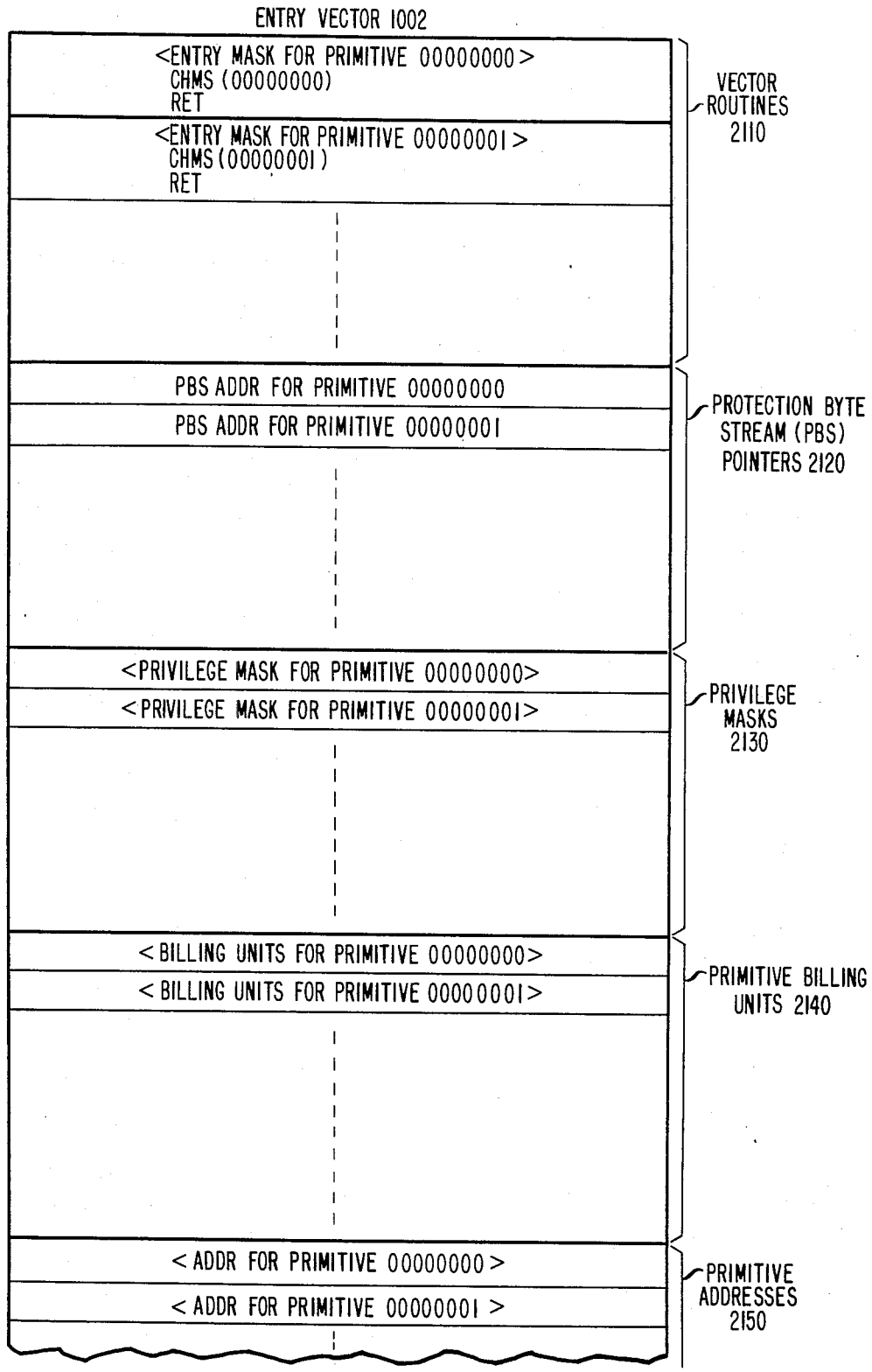
FIG. 21 is a memory map of the entry vector shown in FIG. 10.

As explicitly shown in FIG. 21 for the first two of the vector routines, both of which are associated with primitives, each such routine is comprised of (a) an entry mask, (b) a "change-to-mode-supervisor" (CHMS) instruction, and (c) a "return" (REI) instruction. The entry mask is a two-byte word which indicates to VAX/XMS which of the general purpose registers within the CPU will be used when the primitive executes, so that the contents of those registers can be saved and restored when the routine returns. This having been done, the change mode instruction, which is of the form CHMS (prim-index) is executed. This effects a transfer of control to change mode handler 1530, as noted above, and, in addition, passes the argument "prim-index" to it. This argument is an index associated with the primitive in question. Thus, for example, 00000000 and 00000001 are the primitive indices of the two primitives whose associated vector routines are explicitly shown in FIG. 21. And, of course, when user return routine 1520 returns to the vector routine, as described above, the "return" instruction within each vector routine effects a transfer of control back to the caller of the primitive.

Although no vector routines for subroutines are explicitly shown in FIG. 21, most of them are similar to the vector routines for primitives except that the "change mode" instruction in the latter is replaced in the former by a direct call to the subroutine. (The vector routines for a few of the subroutines, such as subroutines which fill in a data structure associated with semaphores, simply comprise so-called jump instructions.)

Entry vector 1002 also contains protection byte stream pointers 2120. Each of these pointers is an address which defines the starting location within the shared image of a so-called "protection byte stream" associated with each primitive. The protection byte stream principally contains information that will be needed to perform the various primitive checks within step 1533, as described just below. Pointers 2120 are arranged in sequential order in accordance with the indices of the associated primitives. Thus the location within vector 1002 of the protection byte stream pointer for a given primitive is readily determined by adding the index for that primitive to the (known) address of the first protection byte stream pointer.

The protection byte stream format is

<mina, maxa, error, arg_ch_1, arg_ch_2, etc>.

The first two bytes, "mina" and "maxa", respectively indicate the minimum and maximum number of arguments that can correctly be supplied in the primitive call. The byte "error" specifies the action to be taken if any of the checks within step 1533 result in an error, the possible actions illustratively being (a) signal the error condition, i.e., terminate the process, (b) return the appropriate error code to general purpose register R0, or (c) return the error code to register R0 and also supply it as the value of the first argument in the primitive call. The "error" byte is followed by one or more argument-checking bytes, i.e., "arg_ch_1", "arg_ch_2", etc., indicating how successive arguments are to be checked, if at all, by the change mode handler. As will be seen, more than one argument-checking byte may be associated with particular kinds of arguments and some argument-checking bytes are associated with more than one argument.

Consider, for example, the primitive call usr$xyz(parm_ptr, event_1, event_2, . . . , event_n).

The protection byte stream for this primitive is illustratively

[1,255,TKP_SIGNAL,TKP_PWD,64,TKP_EVENT+TKP_ZERO,TKP_ENDREP].

The "1" and "255" in the protection byte stream are the bytes "mina" and "maxa" discussed above and thus indicate that the primitive call can have from 1 to 255 arguments. This means, of course, that the event numbers event_1, event_2, etc., in the primitive call are optional. In addition, TKP_SIGNAL in the protection byte stream is the value of the above-discussed "error" byte and, more particularly, is the mnemonic for a one-byte code which indicates that the error return method is (a) above.

The remainder of the protection byte stream contains the above-mentioned argument-checking bytes. In particular, TKP_PWD is the mnemonic for one-byte code which indicates that the first argument in the primitive call, i.e., parm_ptr, is a pointer to a writable data area and that the byte which follows in the protection byte stream—whose value, in this case, is 64—specifies the size (in bytes) of that data area. This means that change mode handler should check this argument by ensuring that the 64-byte data area pointed to is, in fact, user-writable. Such a check is necessary to prevent a user from accidentally or intentionally causing areas of memory not allowed to the user to be written.

Next in the protection byte stream is TKP_EVENT+TKP_ZERO, which is the mnemonic for a one-byte code which indicates that the next argument in the primitive call, i.e., event_1, is an event number whose value properly may be zero. This means that change mode handler should check this argument, if it exists, by determining whether the specified event number is a valid one.

Finally, TKP_ENDREP indicates that any subsequent arguments should be checked in the same way as that previous, i.e., as event numbers.

As another example, consider the primitive call pqr(adcd,sludata,sirlin,adeventr), whose protection byte stream is illustratively

[4,4,TKP_RETURN,TKP_IGNORE,TKP_PWDFC+TKP_ZERO,8,TKP_EVENT].

The two "4"'s indicate that the primitive call must have exactly four arguments, and TKP_RETURN is the mnemonic for a one-byte code which indicates that error return method (b) above is to be used.

Turning now to the argument-checking bytes, TKP_IGNORE is the mnemonic for a one-byte code which indicates that the first argument in the primitive call, i.e., adcd, should not be checked by the change mode handler because, for example, no check is necessary or the required check too complex to be performed in the change mode handler, in which case it will be performed by the primitive code itself.

The next mnemonic, TKP_PWDFC+TKP_ZERO, represents a one-byte code which indicates that (a) the next argument in the primitive call (sludata) is a pointer to a list of writable data, which pointer can be zero, (b) the number of items in the list is specified by the following argument in the primitive call, i.e., sirlen, and (c) the next byte in the protection byte stream, i.e., 8, specifies the size, in bytes, of each of those items. Again, the check performed by the change mode handler is one of determining that the data area pointed to is user-writable.

Finally, TKP_EVENT represents a one-byte code indicating that the fourth argument in the primitive call is an event number whose value cannot properly be zero.

Some of the other argument-checking codes used in the present system specify that an argument is an integer whose value must fall within some range, which is also specified in the protection byte stream; a pointer to a read-only data area, which is to be checked for user readability, lest the user attempt to read areas of memory not allowed to him or her; a read-only character string, which is also to be checked for user-readability; and pointers which point to other pointers which, in turn, point to read-only or writable data areas. Of course, other argument-checking codes can be established by the system designer, as needed.

Entry vector 1002 also includes privilege masks 2130, billing units 2140 and primitive addresses 2150. Each one of privilege masks 2130 is associated with a respective primitive and defines a level of privilege needed by the user to execute the primitive in question. Illustratively, four levels of privilege are defined: one for general customer-users, one for privileged customer-users (who will be authorized to execute primitives which, for example, install and kill programs and enable and disable terminals) and two for use by the vendor. Each one of billing units 2140 prescribes the above-described billing units for a particular primitive, while each of the primitive addresses 2150 is the internal address of a primitive and is accessed when the primitive is called by the change mode handler. The privilege masks, billing units and primitive address, like the protection byte stream pointers, are arranged in accordance with the index of the associated primitives so that, by knowing the address of the first entry in each region of the vector, the entry associated with any particular primitive is easily determined.

Entry vector 1002 may incude other regions (not shown) such as a region containing, for example ASCII character strings giving the names of the primitives and a region containing pointers to those character strings. These may be used, for example, in the composition of error messages.

We are now in a position to consider the flowchart of FIG. 20, which, again, is a flowchart of step 1533 within change mode handler 1530. In particular it is first determined, as indicated at 2021, whether the primitive index passed to change mode handler 1530 is valid, i.e., is below a certain value. This check should always pass during normal program execution. If it does not, measures are taken to terminate the process, as indicated at 2022.

As indicated at 2023, the routine now determines from the protection byte stream where any error messages are to be delivered, as previously described. Further primitive checks are then made. If any one of these checks fails, control passes to step 1534 within change mode handler 1530, where an error messsage is generated, as previously described. Otherwise control passes to the next check.

In particular, a determination is made, as indicated at 2026, as to whether the privilege associated with the primitive in question, as determined from the appropriate one of privilege masks 2130, is at least as great as the privilege level of the user, which was obtained from the above-mentioned program image profile.

The next check, indicated at 2031, is principally of value when the primitive is called from a low-level, e.g., assembly, language. In such a case, the primitive arguments, rather than being specified in the primitive call, would have been specified via the address of a list in which the arguments are contained. The check that is made at step 2031 determines whether the location specified by that address is one that the caller of the primitive is allowed to read.

There are two principal reasons for making this check. First of all, it prevents a user from "tricking" the system into giving him or her access—via a suitably chosen primitive call—to code and/or data which the user would not otherwise have access to. Moreover, since any area in memory that is readable by code executing in user mode is also readable by code executing in supervisor mode, e.g., the code for the primitive itself, this check, if passed, guarantees that when the argument is actually attempted to be read during execution of the primitive, it will in fact be readable. It is desirable to insure this because if, due to a programming error, for example, the argument list address specified in the low-level primitive call were to be the address of memory that was not readable even by code executing in supervisor mode, a so-called access violation would occur, resulting in termination of the process.

As indicated at 2033, 2038 and 2041, it is now determined whether the number of arguments supplied in the primitive call is less than 256 (which should always be the case), whether the number of arguments is correct, as determined from the protection byte stream, and whether each of the arguments passes the test specified by its associated protection code. Assuming that these checks all pass, control passes out of step 1533 to step 1536 of change mode handler 1530, as previously described.

IV. DETAILS OF SUPERVISOR SOFTWARE STRUCTURE

We are now in a position to take a more detailed look at the software structure of the shared image supervisor. To this end, attention is directed back to the virtual memory map of FIGS. 10-11. It may be helpful to keep in mind as the shared image software structure is discussed that, unless otherwise indicated, its code can be executed only by processes executing in supervisor mode, e.g., control layer processes or application processes whose shared image is already in control.

Unallocated page 1001 and vector 1002 are described, for example, in Sec. II.B.4 and need not be discussed in further detail.

Supervisor start-up module 1004 includes the program code for initialization steps 1401, 1402, 1404 and 1407 as well as the main thread of main task 1420. It also includes the code for steps 1503–1509 of the image task, user return routine 1520, change mode handler 1530, AST return routine 1540, exit handler portions 1651 and 1560, default resource manager 1451, timer task 1465 and the "run image" routine which is called in step 1607 to activate the process-specific image.

Module 1005 includes the initialization and termination scripts described, for example, in Secs. III.A.3 and III.A.7, respectively.

Task control services 1007 includes the routines which create tasks; set and/or get various task attributes such as the suspension bit, the task priority, and a description of the control area; effect the wake/sleep and semaphore operations; suspend a task; cause a task break; define task types; set the task type limits; and preallocate tasks. This module also includes the code for task dispatcher 1411.

Event services module 1009 includes the routines necessary to effectuate the control layer event mechanisms. These include routines (or primitives) which allocate and delete various queues; signal events; cause a task to wait for one or more events; check the status of an event; clear events; set and clear event timers; and set limits for, and preallocate the memory required by the event mechanism. This module also includes the routines which implement the user event primitives and the code for lost signal task 1451.

Module 1014 comprises the routines required to support VAX/VMS condition handling in a tasking environment. The term "condition handling" refers to the execution of program code—the condition handler—specifically designed to deal with such "signaled" occurrences as arithmetic overflow or underflow, operand faults, access violations, out-of-range argument values and the passing of an invalid argument to a called subroutine that does not return a status value, e.g., passing a negative number to a square root routine. This module includes the code for various condition handlers, routines that signal conditions, and routines that set up and clear condition handlers. It also includes a signal dispatcher which processes conditions originating from within the supervisor software.

Inventory control services 1015 enable any program code which has access to them (by virtue of executing in supervisor mode) to keep track of inventories of limited-availability resources, e.g., tasks of a given type, and event blocks. This module includes routines which initialize and terminate the inventory mechanism for a particular resource; get and/or set a count reflecting the available, total, or maximum units of the resource; and set and clear events associated with the crossing of upper and lower inventory thresholds (the occurrence of which events signals default resource manager 1451).

Primitive entry processing module 1017 principally comprises change mode handler 1530 and its associated routines.

Memory allocation services module 1019 includes all of the memory allocation routines within the shared image. These include routines which can be called from outside of the supervisor by both shared image code and process-specific image code to allocate and free memory within M0 or M1 space. It also includes a number of routines which are called internally by the shared image supervisor in furtherance of providing those memory services.

Utility routines module 1022 contains a number of small routines which provide access to the VAX character, bit addressing and doubly-linked queue instructions so that these features can be used from high-level languages.

Operating system interface routines 1024 is comprised of interfaces to various operating system services. These interfaces are provided to make the services easier to call and less VAX-oriented. In particular, versions of certain VMS I/O system services are available which appear to be synchronous to the calling task (see II.B.1) but which actually allow other tasks to execute while the calling task is waiting for the operation to complete.

Sequential file I/O services module 1025 interfaces with the operating system to provide a package of routines for opening, closing, reading and writing and marking for deletion sequential files containing variable length records. These routines can be used both to produce print files and to perform terminal I/O.

Block file I/O services module 1027 interfaces with the operating system to provide a package of routines for opening, closing, reading and writing and marking for deletion the blocks of an arbitrary disk file. Routines for getting block numbers are also included.

Log file output services module 1029 is comprised of routines which enable the writing of records to a so-called log file to facilitate debugging of control layer software and for complete reporting of failures in the field.

Process creation service 1032 is comprised, essentially, of one routine which, when called, invokes the VMS process creation service. In the present embodiment, this routine is called only by the MAC process (FIG. 9) to create the other control layer processes and by the ACP process (see the discussion in Sec. III.A.1) to create all of the application processes.

The foregoing is merely illustrative of a system embodying the invention. For example, if restricting customer access to particular communications processing and/or supervisor services were not a concern, both the process-specific image and the software providing such services could be executed in a single processor access mode—as, indeed, is the case with the control layer processes of the present embodiment. Moreover, although there is only one task—the image task—associated with the process-specific image of application processes in the present illustrative embodiment, the system could be so arranged as to allow the process-specific image of such processes to create tasks having, for example, either higher or lower task priority then the image task. Thus in such a situation, or in any event, the image task might be assigned something other than the lowest task priority. It should also be noted that the invention can be implemented in a system wherein the communications processing and supervisor functions are subsumed within the operating system rather than being provided by a separate "shared image." Nor is the invention limited to systems using virtual memory.

In short, numerous facets of the implementation described herein will be appreciated as being merely illustrative, and those skilled in the art will be able to devise numerous arrangements and variations which, although not explicitly shown or described herein, embody the principles of the invention.

What is claimed is:

1. In a packet switching or data communication or processing system in which images are executed in respective associated computer processes, said system comprising
    means within each process for creating a plurality of tasks, at least ones of said tasks being adapted to provide services to the associated image,
    dispatcher means operative for passing program control among ones of said tasks which are runnable, a plurality of routines each of whose execution causes at least one of said tasks to be made runnable, and means operative in response to the calling of an individual one of said routines by said associated image for vesting program control in another one of said tasks prior to the execution of said routine, said one of said tasks being adapted to invoke the operation of said dispatcher means at the end of execution of said individual one of said routines and to thereafter at least initiate the vesting of program control in said associated image.

2. The invention of claims 1 wherein each of said tasks has an assigned priority and wherein said dispatcher means performs said passing in accordance with said priorities.

3. The invention of claim 2 wherein the priority of said one task is lower than the priorities of at least some of the other tasks.

4. The invention of claim 1 wherein at least one of said processes executes in either of at least first and second processor access modes, wherein said tasks execute in said first processor access mode and said associated image executes in said second processor access mode.

5. The invention of claim 4 wherein said one task causes the execution of said one process to be switched from said first to said second processor access mode substantially concurrent with said vesting of program control in said associated image and wherein said vesting means causes operation of said computer system to be switched from said second to said first processor access mode substantially concurrent with the vesting of program control in said one task.

6. The invention of claims 1, 4 or 5 further comprising at least one interrupt service routine for causing at least an individual one of said tasks to be made runnable in response to delivery of an interrupt during execution of said associated image and means for vesting program control in said one task no later than the end of execution of said interrupt service routine, said one of said tasks being further adapted to thereafter invoke the operation of said dispatcher means and to thereafter at least initiate the vesting of program control in said associated image.

7. The invention of claim 3 further comprising at least one interrupt service routine for causing at least an individual one of said tasks to be made runnable in response to delivery of an interrupt during execution of said associated image and means for vesting program control in said one task no later than the end of execution of said interrupt service routine, said one of said tasks being further adapted to thereafter invoke the operation of said dispatcher means and to thereafter at least initiate the vesting of program control in said associated image.

8. The invention of claims 1, 4 or 5 wherein at least some of said services include manipulation of data associated with said associated image.

9. The invention of claim 3 wherein at least some of said services include manipulation of data associated with said associated image.

* * * * *